United States Patent [19]

Saito

[11] Patent Number: 5,166,894

[45] Date of Patent: Nov. 24, 1992

[54] METHOD AND APPARATUS FOR CELL LOSS RATE ESTIMATION, CALL ADMISSION CONTROL, AND BUFFER/LINK CAPACITY DESIGNING IN INTEGRATED NETWORK

[75] Inventor: Hiroshi Saito, Tokyoi, Japan

[73] Assignee: Nippon Telegraph and Telephone Corp., Japan

[21] Appl. No.: 612,959

[22] Filed: Nov. 15, 1990

[30] Foreign Application Priority Data

Feb. 13, 1990 [JP] Japan .................................. 2-31782

[51] Int. Cl.⁵ ........................ G06F 7/38; H04M 3/00; H04J 3/24
[52] U.S. Cl. .............................. 364/715.01; 379/197; 370/94.1
[58] Field of Search .................. 364/715.01, 735, 736; 370/60, 95.1, 54, 85.13, 17, 94.1; 379/197

[56] References Cited

U.S. PATENT DOCUMENTS 4,947,388  8/1990  Kuwahara et al. .................... 370/60
4,975,906  12/1990  Takiyasu et al. .................... 370/94.1
4,984,264  1/1991  Katsube ................................. 379/197

OTHER PUBLICATIONS

Bolotin, V. A., et al.; "Broadband Technologies: Architectures, Applications, Control and Performance" Paper presented at International Teletraffic Congress Seventh Specialist Seminar, New Jersey, 1990, Oct.

*Primary Examiner*—Long T. Nguyen
*Attorney, Agent, or Firm*—Wigman & Cohen

[57] ABSTRACT

A method and an apparatus for the cell loss rate estimation in an integrated network, capable of highly accurate estimation which is not too small compared with the actual cell loss rate. In the apparatus, inputting probability density functions of number of arriving cells and an average number of arriving cells for a prescribed constant period of time; calculating a weighted sum of the probability density functions of number of arriving cells, using weight factors which depend on a buffer capacity of the output buffer and a link capacity of the integrated network; and obtaining an estimation value for the cell loss rate by dividing the weighted sum by the average number of arriving cells. These method and apparatus for the cell loss rate estimation are applied to a method and an apparatus for the call admission control as well as a method and an apparatus for the buffer/link capacity designing.

20 Claims, 10 Drawing Sheets

METHOD AND APPARATUS FOR CELL LOSS RATE ESTIMATION, CALL ADMISSION CONTROL, AND BUFFER/LINK CAPACITY DESIGNING IN INTEGRATED NETWORK

BACKGROUND OF THE INVENTION

1. Field of the Invention

The present invention relates to a so called ATM (Asynchronous Transfer Mode) network which is one of the most promising high-speed, broadband communication network, and more particularly, to a cell loss rate estimation, a call admission control, and a buffer/link capacity designing suitable for such an ATM network.

2. Description of the Background Art

Recently, the ATM network has been attracting much attentions as one of the most promising high-speed, broadband communication network. The ATM is a mode of transferring various information such as audio information, video information, and other data in terms of blocks of a fixed length called cells, as such information is generated. The ATM network is a communication network using this ATM as a transfer mode.

In the ATM network, as shown in FIG. 1, a request for setting up a call (call generating cell) have to be made from a terminal to the network (an exchanger) first, and then only when the call set up is admitted by the network, the cells (user information) corresponding to this call are sent to the network, until this call is finished (releasing cell).

Such an ATM network generally comprises, as shown in FIG. 2, a number of ATM exchangers 1 mutually connected by links 2; and a number of terminals 3, each of which is connected to one of the ATM exchangers 1.

Each ATM exchanger 1 comprises, as shown in FIG. 3, a switch unit 1—1 for receiving cells from an input link; a call admission control unit 1-2, connected to the input link, for controlling admission to be granted to each incoming call; and output buffers 1-3, connected to an output link, for temporarily storing the cells received by the switch unit 1—1.

The call admission control unit 1-2 receives a call set up request cell containing information concerning a call set up, which is normally a top cell of a group of cells corresponding to the call, and determines whether this call is admissible or inadmissible, i.e., whether the network can accommodate this call or not, according to the information concerning a call set up. Namely, as shown in FIG. 4, the call admission control unit 1-2 comprises a traffic parameter receiving unit 1-21 for receiving prescribed set of parameters related to the call set up from the call set up request cell; a cell loss rate estimation unit 1-22 for estimating the cell loss rate according to the parameters received by the traffic parameter receiving unit 1-21, by means of a convolution operation unit 1-23; and an admission judging unit 1-24 for judging whether or not to grant an admission to this call according to the estimated cell loss rate.

Thus, when the admission is granted by the admission control unit 1-2, the cells of the call arriving to the ATM exchanger 1 from the input link are exchanged at the switch unit 1—1, and then sent out to the output link through the output buffers 1-3. Here, the output buffers 1-3 have a finite capacity, so that when the number of arriving cells exceeds the given capacity of the output buffers 1-3, the excessive cells are simply discarded. Such a discarding of the excessive cells deteriorates the quality of service (grade of service). Thus, the admission control unit 1-2 have to estimate the cell loss rate, i.e., what fraction of all the cells received is likely to be discarded, and determine the admissibility of the call according to whether the estimated cell loss rate is within a predetermined tolerable range for which a satisfactory quality of service can be maintained.

This operation of admission control unit 1-2, in which whether the admission is to be granted to the call or not, i.e., whether the cell loss rate resulting from the admission of this call is still within the tolerable range or not, is determined according to the cell loss rate estimated on a basis of the specified parameters, is called a call admission control.

In general, in a course of the call admission control, it becomes necessary to estimate and evaluate the cell loss rate of each output buffer in a case the requesting call is admitted, on a basis of the traffic parameters of the call requesting a set up, the traffic parameters of the connected calls, and the measurement results for the number of cells produced by the connected calls, in order to judge whether the cell loss rate of each output buffer in a case the requesting call is admitted is lower than the predetermined cell loss rate reference value.

Here, the traffic parameters contain the information concerning the number of cells to be produced by the call, such as an average bit rate and a peak bit rate, for example. The average bit rate is a rate obtained by dividing a bit length of one cell by an average cell production interval, and the peak bit rate is a rate obtained by dividing a bit length of one cell by a shortest cell production interval. Such traffic parameters have to be specified by the user beforehand, so that it is preferable to select easily specifiable quantities as these traffic parameters.

In the ATM call admission control, the estimation and evaluation of the cell loss rate in a case the requesting call is admitted have to be performed at high-speed, because it is necessary to respond very quickly to the call set up request.

The cell loss rate is also indispensable for the ATM network designing in which a buffer capacity or a link capacity suitable for the network is dimensioned.

In this regard, in a conventional network such as a conventional telephone network, a number of communication lines (a maximum number of calls that can be set up simultaneously) is uniquely determined from the amount of offered load between the exchangers and the call loss rate, from which the link capacity can be determined easily. For example, for 100 communication lines, the link capacity has to be 64 Kb/s×100=6.4 Mb/s.

However, in the ATM network, even when the maximum number of calls that can be simultaneously connected is given, the link capacity cannot be determined. This is because, in the ATM network, the cell loss rate for the cells produced by the call set up becomes a complicated function of a number of connected calls, statistical characteristics of arrival of cells, the output buffer capacity, and the link capacity.

In the ATM network designing, a number of connected calls, statistical characteristics of arrival of cells, the prescribed cell loss rate reference value, and the quality reference value such as the maximum tolerable delay are given, and the output buffer capacity and the link capacity are dimensioned from these information. Thus, in the ATM network designing, it is necessary to estimate how the cell loss rate of each output buffer changes when the buffer capacity and the link capacity are varied while the number of connected calls and the statistical characteristics of arrival of cells are fixed, for each output buffer of each link.

Here, the statistical characteristics are preferably those related to the lower moments for the cell arrival interval or the number of cells arriving within a given period of time, as they are easy to measure.

As for the statistical characteristics related to the cell arrival process, the statistical characteristics concerning the traffic parameters such as a distribution of the specified average bit rates may be used, rather than the characteristics directly related to the actual cell arrival process, so that it is preferable that the input of the designing apparatus is capable of reflecting the specified values.

Moreover, the designing apparatus should be constructed without a specialized procedure such as a modelling of the arrival process which calls for a human operation, after the statistical characteristics related to the arrival of cells are given.

Now, the conventional method for estimating the cell loss rate in the ATM network can be classified into two categories.

The first method is that which has been achieved with the application to the call admission control in mind, the detail of which had been reported by Suzuki et al. in "A simple and burst-variation independent measure of service quality for ATM traffic control", the international teletraffic congress, seventh specialist seminar, New Jersey, October, 1990. In this method, a probability distribution F of a number of cells $\times$ (bit/s) resulting for a given instance due to the traffic parameters of each call is derived at each output link, and by using the link capacity C (bit/s), the estimated value for the cell loss rate is obtained as:

$$\int_C^\infty (x - C)dF(x)/E[x]$$

where E[x] denotes an average value of x.

The second method is that which utilizes a so called queuing theory, in which the cell loss rate for each buffer is obtained from the distribution of the cell arrival intervals.

Of these two method, the first method completely ignores the output buffer capacity so that it has the drawbacks of:

i) being inapplicable to the ATM network designing including the designing of the output buffer capacity; and ii) being unable to ascertain whether the estimated value for the cell loss rate is greater or smaller than the actual cell loss rate, so that the estimated value cannot be evaluated as to whether the condition with respect to the prescribed cell loss rate reference value is satisfied or not.

As for the second method, it requires a complicated analytical process, so that it has the drawbacks of:

i) being unable to adapt the high-speed processing;

ii) being based on the quantities which are both difficult to measure in the ATM network in which a large number of cells are transferred at the high-speed, as well as difficult for the user to specify beforehand as the traffic parameters, such as the higher moments for the cell arrival interval or the correlations;

iii) being requiring a so called modelling step which calls for a human operation; and iv) calls have to be classified into a small number of categories.

SUMMARY OF THE INVENTION

It is therefore an object of the present invention to provide a simple method and a simple apparatus for the cell loss rate estimation in an integrated network such as an ATM network, capable of highly accurate estimation which is not small compared with the actual cell loss rate, without the aforementioned problems of the conventional cell loss rate estimation methods.

It is another object of the present invention to provide a method and an apparatus for the call admission control in the integrated network, utilizing the above method and apparatus for the cell loss rate estimation.

It is another object of the present invention to provide a method and an apparatus for the buffer/link capacity designing in the integrated network, utilizing the above method and apparatus for the cell loss rate estimation.

According to one aspect of the present invention there is provided a method of estimating a cell loss rate for a finite capacity output buffer in an integrated network, comprising the steps of: inputting probability density functions of number of arriving cells $\{p(k), k=0, 1, \ldots\}$ and an average number of arriving cells A for a prescribed constant period of time $T_A$; calculating a weighted sum $\Sigma\ w(k)p(k)$ of the probability density functions of number of arriving cells p(k), using weight factors w(k) which depend on a buffer capacity K of the output buffer and a link capacity C of the integrated network; and obtaining an estimation value B(p) for the cell loss rate by dividing the weighted sum $\Sigma\ w(k)p(k)$ by the average number of arriving cells A.

According to another aspect of the present invention there is provided an apparatus for estimating a cell loss rate for a finite capacity output buffer in an integrated network, comprising: means for inputting probability density functions of number of arriving cells $\{p(k), k=0, 1, \ldots\}$ and an average number of arriving cells A for a prescribed constant period of time $T_A$; means for calculating a weighted sum $\Sigma\ w(k)p(k)$ of the probability density functions of number of arriving cells p(k), using weight factors w(k) which depend on a buffer capacity K of the output buffer and a link capacity C of the integrated network; and means for obtaining an estimation value B(p) for the cell loss rate by dividing the weighted sum $\Sigma\ w(k)p(k)$ by the average number of arriving cells A.

According to another aspect of the present invention there is provided a method of buffer/link capacity designing for a finite capacity output buffer in an integrated network, comprising the steps of: inputting probability density functions of number of arriving cells $\{p(k), k=0, 1, \ldots\}$ and an average number of arriving cells A for a prescribed constant period of time $T_A$; calculating a weighted sum $\Sigma\ w(k)p(k)$ of the probability density functions of number of arriving cells p(k), using weight factors w(k) which depend on a buffer capacity K of the output buffer and a link capacity C of the integrated network; obtaining an estimation value B(p) for the cell loss rate by dividing the weighted sum $\Sigma\ w(k)p(k)$ by the average number of arriving cells A; and determining the buffer capacity K and the link capacity C such that the estimation value B(p) becomes not greater than a prescribed reference value.

According to another aspect of the present invention there is provided an apparatus for buffer/link capacity designing for a finite capacity output buffer in an integrated network, comprising: means for inputting probability density functions of number of arriving cells {p(k), k=0, 1, ... } and an average number of arriving cells A for a prescribed constant period of time $T_A$; means for calculating a weighted sum $\Sigma$ w(k)p(k) of the probability density functions of number of arriving cells p(k), using weight factors w(k) which depend on a buffer capacity K of the output buffer and a link capacity C of the integrated network; means for obtaining an estimation value B(p) for the cell loss rate by dividing the weighted sum $\Sigma$ w(k)p(k) by the average number of arriving cells A; and means for determining the buffer capacity K and the link capacity C such that the estimation value B(p) becomes not greater than a prescribed reference value.

According to another aspect of the present invention there is provided a method of call admission control for a finite capacity output buffer in an integrated network, comprising the steps of: inputting probability density functions of number of arriving cells {p(k), k=0, 1, ... } and an average number of arriving cells A for a prescribed constant period of time $T_A$; calculating a weighted sum $\Sigma$ w(k)p(k) of the probability density functions of number of arriving cells p(k), using weight factors w(k) which depend on a buffer capacity K of the output buffer and a link capacity C of the integrated network; obtaining an estimation value B(p) for the cell loss rate by dividing the weighted sum $\Sigma$ w(k)p(k) by the average number of arriving cells A; and determining that a new call is to be admitted when the estimation value B(p) obtained by assuming an admission of said new call becomes not greater than a prescribed reference value, and that said new call is to be rejected otherwise.

According to another aspect of the present invention there is provided an apparatus for call admission control for a finite capacity output buffer in an integrated network, comprising: means for inputting probability density functions of number of arriving cells {p(k), k=0, 1, ... } and an average number of arriving cells A for a prescribed constant period of time $T_A$; means for calculating a weighted sum $\Sigma$ w(k)p(k) of the probability density functions of number of arriving cells p(k), using weight factors w(k) which depend on a buffer capacity K of the output buffer and a link capacity C of the integrated network; means for obtaining an estimation value B(p) for the cell loss rate by dividing the weighted sum $\Sigma$ w(k)p(k) by the average number of arriving cells A; and means for determining that a new call is to be admitted when the estimation value B(p) obtained by assuming an admission of said new call becomes not greater than a prescribed reference value, and that said new call is to be rejected otherwise.

Other features and advantages of the present invention will become apparent from the following description taken in conjunction with the accompanying drawings.

DETAILED DESCRIPTION OF THE PREFERRED EMBODIMENTS

Now, the preferred embodiments of the present invention will be described with references to the figures. In the following, a buffer capacity of an ATM exchanger is denoted as K, a link capacity of an ATM exchanger is denoted as C (bit/s) and a cell length in an ATM exchanger denoted as L (bit).

According to the present invention, the cell loss rate B(p) is estimated by a formula:

$$B(p) = \sum_{k=0}^{\infty} w(k)p(k)/A, \ k = 0, 1, \ldots$$

where w(k) are weight factors for weighted sum which depend on the buffer capacity K and the link capacity C, p(k) are probability density functions of number of arriving cells, i.e., functions expressing a probability distribution for number for arriving cells during a prescribed fixed length interval of time $T_A$, and A is an average number of cells arriving during the prescribed fixed length interval of time $T_A$.

With judicious choices of the weight factors w(k), this estimation is capable of yielding the estimated value for the cell loss rate which is not small compared with the actual value for the cell loss rate, such that when the estimated value for the cell loss rate is not greater than the prescribed cell loss rate reference value, the actual value for the cell loss rate can also be considered as not greater than the prescribed cell loss rate reference value.

As the appropriate weight factors, the following examples are known to be particularly efficient.

$$w(k) = \frac{T_A}{T_A - KL/C} [k - K]^+ + d(k), \quad (1)$$

$$k = 0, 1, \ldots$$

where $$[x]^+ = \begin{cases} x & \text{if } x \geq 0 \\ 0 & \text{if } x < 0 \end{cases}$$

and $d(k)$ is an arbitrary non-negative function.

$$w(k) = ([k-r]^+ + [k-K+r]^+) + d(k), \quad (2)$$

$$k = 0, 1, \ldots$$

where $r = T_A/h$, $r$ is an integer, $h$ (sec) $= L/C$ is a cell transfer time, $$[x]^+ = \begin{cases} x & \text{if } x \geq 0 \\ 0 & \text{if } x < 0 \end{cases}$$

and $d(k)$ is an arbitrary non-negative function.

$$w(k) = [k - (CT_A/L)]^+ + d(k), \quad k = 0, 1, \ldots \quad (3)$$

where $CT_A/L \leq (K+1)$, $$[x]^+ = \begin{cases} x & \text{if } x \geq 0 \\ 0 & \text{if } x < 0 \end{cases}$$

and $d(k)$ is an arbitrary non-negative function.

It is to be noted that the other forms for the weighted factors $w(k)$ can also be obtained as variations of these examples enumerated above.

Moreover, this cell loss rate estimation of the present invention is capable of providing a unified approach in a buffer/link capacity designing and a call admission control which does not require a classification of calls in prescribed categories, as described in detail below.

Figure 1:
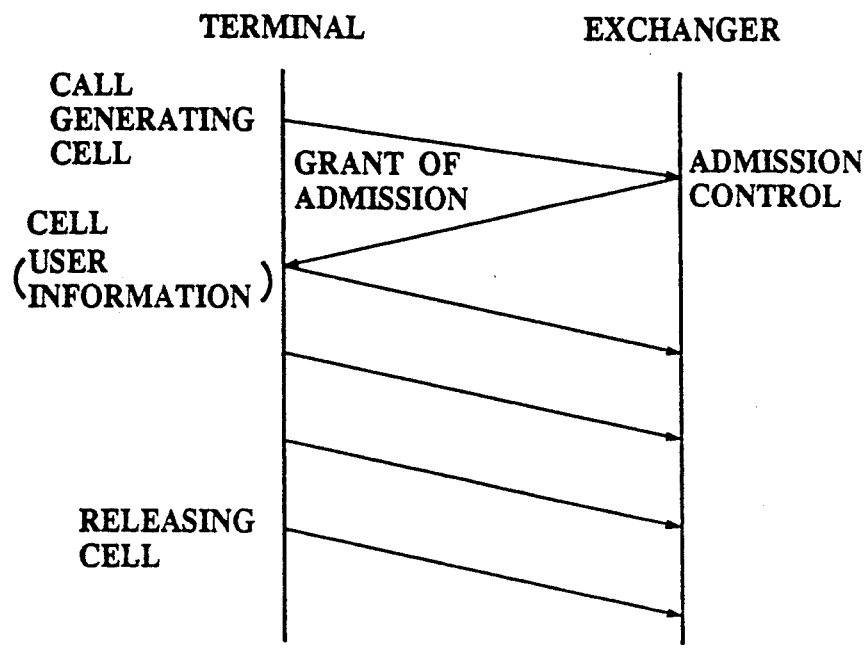
FIG. 1 is a diagram for explaining a call admission control in a conventional ATM network.
Figure 2:
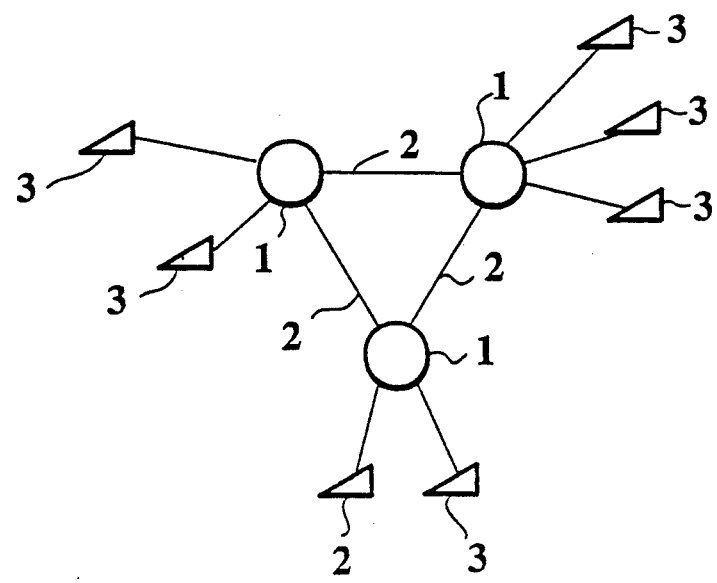
FIG. 2 is a schematic diagram of a conventional ATM network.
Figure 3:
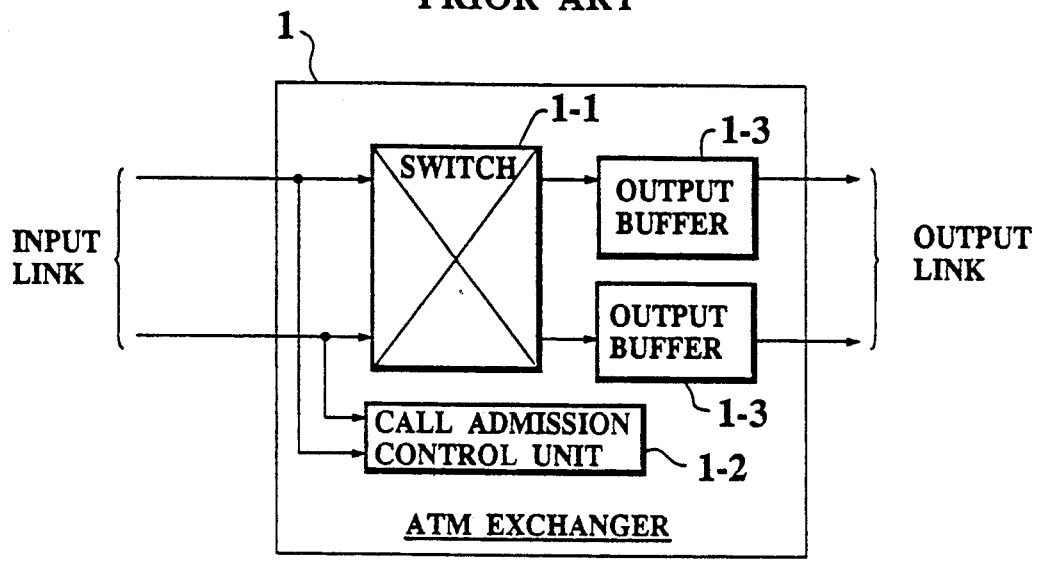
FIG. 3 is a schematic block diagram of a conventional ATM exchanger.
Figure 4:
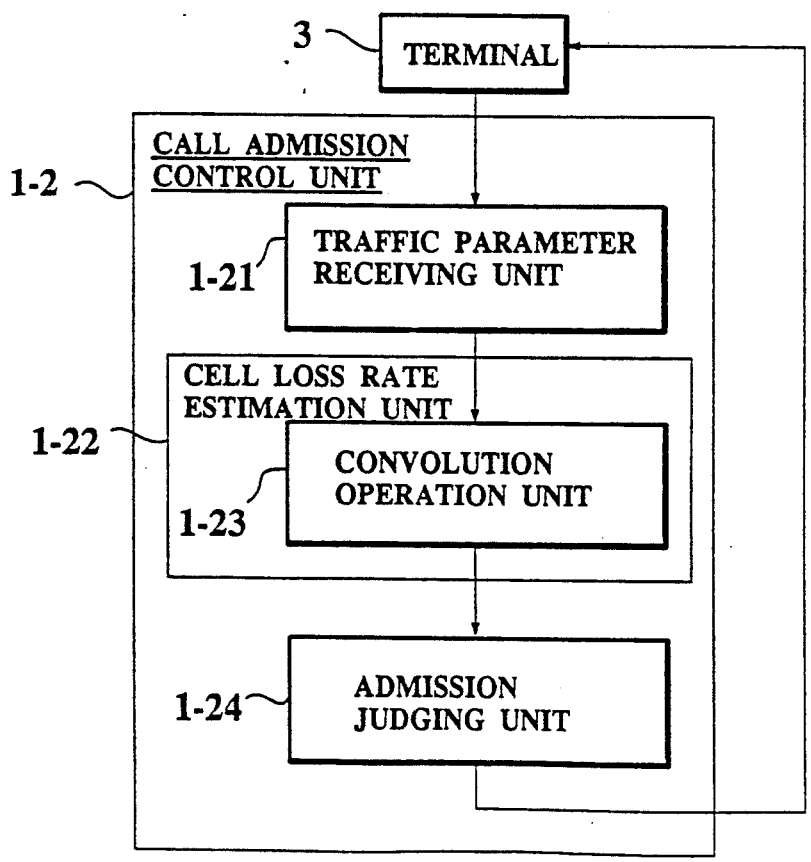
FIG. 4 is a schematic block diagram of a conventional call admission control unit.
Figure 5:
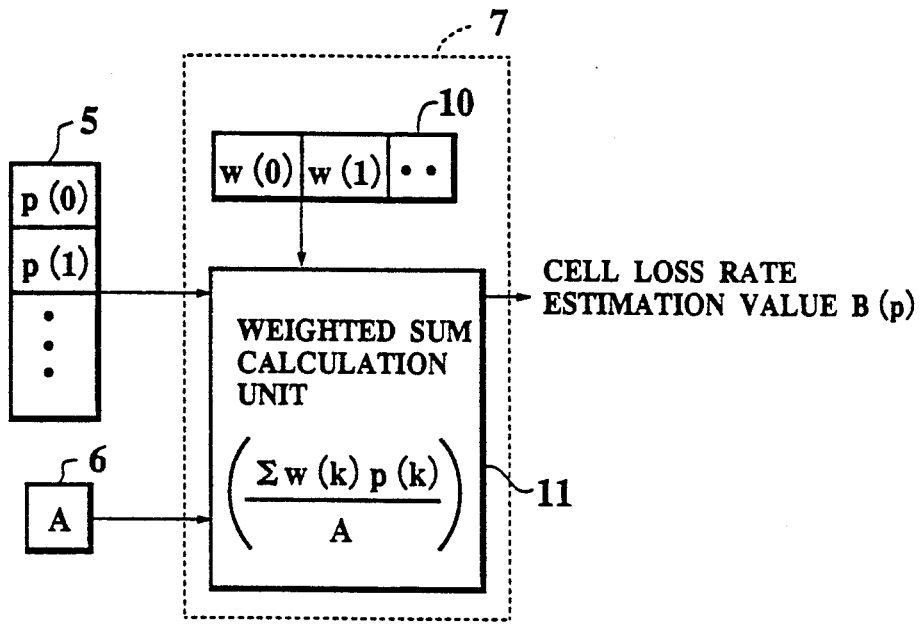
FIG. 5 is a schematic block diagram of one embodiment of an apparatus for cell loss rate estimation according to the present invention.

Referring now to FIG. 5, the first embodiment of an apparatus for cell loss rate estimation according to the present invention will be described.

In this cell loss rate estimation apparatus 7, the probability density functions of number of arriving cells $p(k)$ and the average number A of arriving cells within a period of $T_A$ are given as the input data, from a probability density function input unit 5 and an average number of arriving cells input unit 6. These probability density functions of number of arriving cells $p(k)$ and the average number A of arriving cells within a period of $T_A$ may be obtained either according to the measurements performed in the ATM network, or according to the traffic parameters specified by each call.

The weight factors $w(k)$ are stored in advance in a memory unit 10, and these weight factors $w(k)$ stored in the memory unit 10 are given to a weighted sum calculation unit 11 along with the probability density functions of number of arriving cells $p(k)$ and the average number A of arriving cells within a period of $T_A$. The weighted sum calculation unit 11 performs the aforementioned calculation of $\Sigma w(k)p(k)/A$, and outputs the obtained result as a cell loss rate estimation value $B(p)$.

Figure 6:
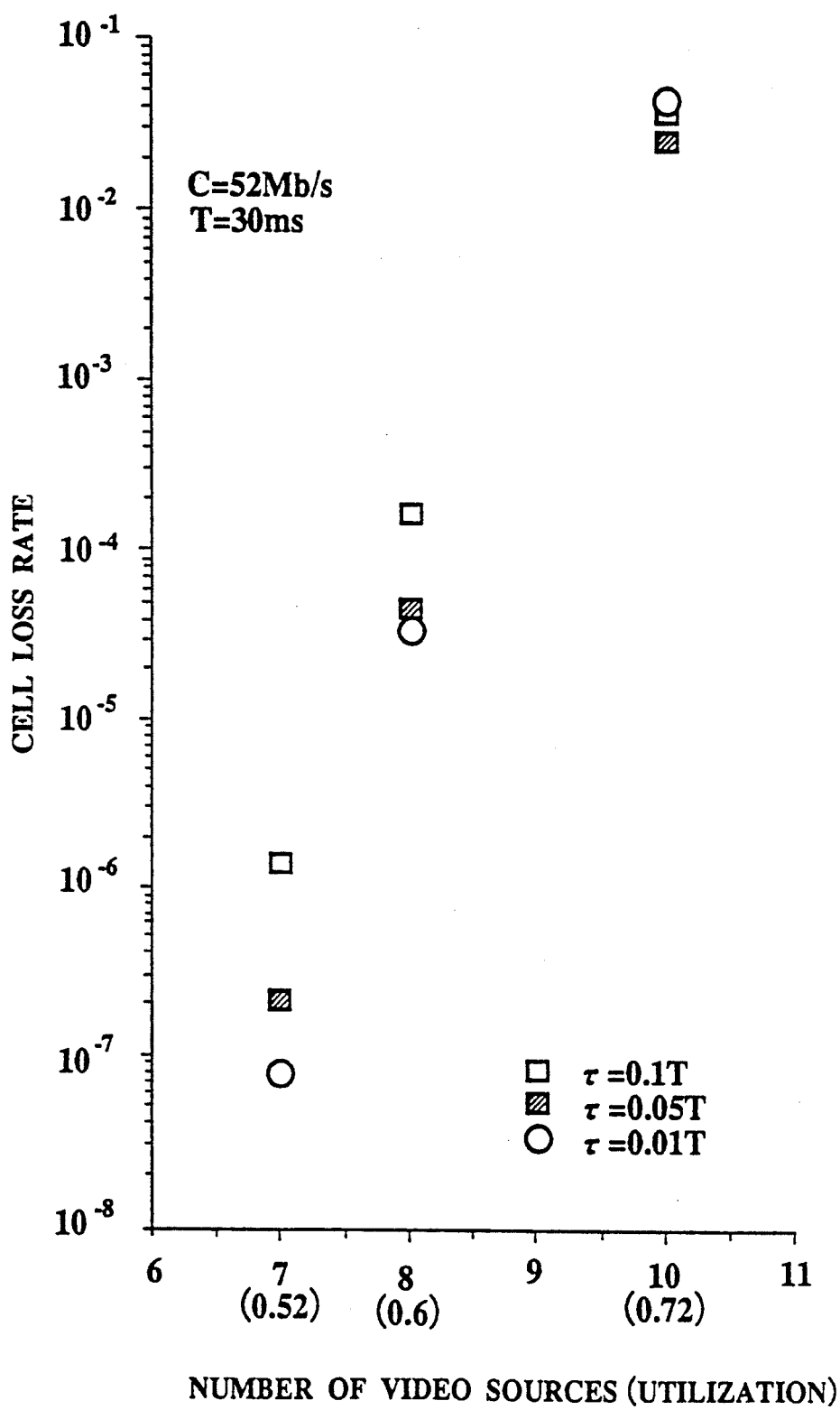
FIG. 6 is a graph of a cell loss rate versus a number of calls obtained by the apparatus of FIG. 5.

Examples of the cell loss rate estimation values $B(p)$ obtained by this apparatus of the first embodiment are shown in FIG. 6, for which the following settings are used:

$C = 52$ Mb/s $T = 30$ ms $\tau = 0.1T, 0.05T, 0.01T,$ where $\tau = T_A - T$, $T = KL/C$ and where the weight factors (1) described above are used, and a normal distribution is used for the probability density functions of number of arriving cells $p(k)$, while the average and the variance in the normal distribution are derived from the actual video communication data.

The fact that the cell loss rate estimation value obtained by this apparatus of the first embodiment is not small compared with the actual value for the cell loss rate can be verified as follows.

First, a case of using the weight factors (1) will be described.

Now, let $n(t)$ be a number of cells which are in a process of being transferred or being stored in the buffer at a time $t$, $l(s,t)$ be a number of cells discarded after a time $s$ until the time $t$, and $a(s,t)$ be a number of cells arriving after the time $s$ until the time $t$. Then, with $\tau = T_A - T$ and $T = KL/C$, the following relationships hold:

$$n(t) \leq [n(t-T) - K]^+ a(t-T,t) \leq a(t-T,t) + 1 \quad (A.1)$$

$$l(i\tau, (i+1)\tau \leq [n(i\tau) + a(i\tau, (i+1)\tau) - K - 1]^+ \leq [a(i\tau - T, (i+1)\tau) - K]^+ \quad (A.2)$$

Also, for those values of $s$ such that $0 < s \leq \tau$, there is a following relationship:

$$l(i\tau, i\tau+s) \leq l(i\tau, (i+1)\tau) \quad (A.3)$$

and therefore, for those values of $t$ such that $k\tau < t \leq (k+1)\tau$, there are following relationships:

$$l(0,t) \leq l(0,(k+1)\tau) \quad (A.4)$$
$$= \sum_{i=0}^{k} l(i\tau, (i+1)\tau)$$
$$= \sum_{i=0}^{k} [a(i\tau - T, (i+1)\tau) - K]^+$$

and $$\frac{l(0,t)}{a(0,t)} \leq \frac{1}{k+1} \left( \frac{a(0,t)}{k+1} \right)^{-1} \sum_{i=0}^{k} [a(i\tau - T, (i+1)\tau) - K]^+ \quad (A.5)$$
$$\leq \left( \frac{a(0,k\tau)}{k} \frac{k}{k+1} \right)^{-1} \frac{1}{k+1} \sum_{i=0}^{k} [a(i\tau - T, (i+1)\tau) - K]^+$$

Thus, when $t \to \infty$, using the above equations and the ergodicity, the true value for the cell loss rate $B_{true} = \lim_{t \to \infty} l(0,t)/a(0,t)$ satisfies the following relationship:

$$B_{true} \le \frac{1}{\text{average number of cells arriving in } \tau \text{ sec.}} \sum_{j=0}^{\infty} [j-K]^+ p(j) \quad (A.6)$$

$$= \frac{T_A}{A(T_A - KL/C)} \sum_{j=0}^{\infty} [j-K]^+ p(j)$$

$$= \sum_{j=0}^{\infty} w(j)p(j)/A$$

This proves that the cell loss rate estimation value obtained by this apparatus of the first embodiment is not small compared with the actual value for the cell loss rate, for a case of using the weight factors (1) with the arbitrary non-negative function d(k) set equal to zero. It is obvious that when $$B_{true} \le \sum_{j=0}^{\infty} w(j)p(j)/A$$

as demonstrated above, it also follows that $$B_{true} \le \sum_{j=0}^{\infty} (w(j) + d(k))p(j)/A$$

for any non-negative function d(k), so that the above proof is sufficient for all of the weight factors (1).

Next, a case of using the weight factors (2) will be described.

As before, let n(t) be a number of cells which are in a process of being transferred or being stored in the buffer at a time t, l(s, t) be a number of cells discarded after a time s until the time t, and a(s, t) be a number of cells arriving after the time s until the time t. The number of cells discarded will also be written as l(s, t; n(s)) whenever its dependence on n(s) is to be emphasized.

First of all, considering l(0, khr; n(0)), there is a following relationship:

$$\max l((k-1)hr, khr; n((k-1)hr)) = [n((k-1)hr) + a((k-1)hr, khr) - (K+1)]^+ \quad (B.1)$$

Then, by using an optimization method of dynamical programming, there is a following relationship:

$$\max l((k-2)hr, khr; n((k-2)hr)) = \quad (B.2)$$

-continued
$$\max\{l((k-2)hr, (k-1)hr; n((k-2)hr)) + [n((k-1)hr) + a((k-1)hr, khr) - (K+1)]^+\}$$

Now, to simplify the suffix, let:

$$n_i = n((k-i)hr),$$

$$a(i) = a((k-i)hr, (k-i+1)hr),$$

and $$l_i(n_i) = l((k-i)hr, (k-i+1)hr; n((k-i)hr)).$$

Then, $$(W((k-2)hr) - W((k-1)hr))/(hC) + a(2) = r + l_2(n_2) - i((k-2)hr, (k-1)hr)/h \quad (B.3)$$

where i((k−2)hr, (k−1)hr) is a length of a link idle period after a time (k−2)hr until a time (k−1)hr, and W(t) denotes a work done at a time t. Here, there is a following relationship:

$$n(t) = \lceil W(t)/L \rceil = \lceil W(t)/(hC) \rceil$$

where ⌈x⌉ denotes a smallest integer not less than x.
Now, $$n_2 - n_1 + a(2) = r + l_2(n_2) - i_2 \quad (B.4)$$

where $$i_2 = i((k-2)hr, (k-1)hr)/h + \{\lceil W((k-1)hr)/(Ch) \rceil - W((k-1)hr)/(Ch)\} - \{\lceil W((k-2)hr)/(Ch) \rceil - W((k-2)hr)/(Ch)\} \quad (B.5)$$

Then, from the equations (B.2) and (B.4), it follows that:

$$\max l((k-2)hr, khr + n((k-2)hr)) = \quad (B.6)$$
$$\max\{l_2(n_2) + [n_2 + a(2) - r - l_2(n_2) + i_2 + a(1) - (K+1)]^+\} \le \max\{l_2(n_2), n_2 + a(2) - r + i_2 + a(1) - (K+1)\}$$

where max {a, b} denotes a larger one of a and b.
Now, $$l_2(n_2) \le [n_2 + a(2) - (K+1)] \quad (B.7)$$

and $$i_2 \le [r - W((k-2)hr)/(Ch) + \{W((k-1)hr)/(Ch) - W((k-1)hr)/(Ch)\} - \{W((k-2)hr)/(Ch) - W((k-2)hr)/(Ch)\}]^+ \quad (B.8)$$
$$\le [r + 1 - n_2]^+$$

so that $$\max l((k-2)hr, khr; n((k-2)hr)) \quad (B.9)$$
$$\le \max\{[n_2 + a(2) - (K+1)]^+, n_2 + a(2) - r + [r+1-n_2]^+ + a(1) - (K+1)\}$$
$$\le \begin{cases} \max\{[n_2 + a(2) - (K+1)]^+, n_2 + a(2) - (K+1) + a(1) - r]^+\} & \text{if } r+1 \le n_2 \\ \max\{[n_2 + a(2) - (K+1)]^+, a(1) + a(2) - K\} & \text{if } r+1 > n_2 \end{cases}$$

$$\le \begin{cases} [n_2 + a(2) - (K+1)]^+ + [a(1) - r]^+ & \text{if } r+1 \le n_2 \\ [n_2 + a(2) - (K+1)]^+ + [a(1) + a(2) - K]^+ & \text{if } r+1 > n_2 \end{cases}$$

$$\le [n_2 + a(2) - (K+1)]^+ + [a(1) - r]^+ + [a(2) - K + r]^+$$

Similarly,

-continued $$\max l((k-3)hr, khr; n((k-3)hr)) \quad \text{(B.10)}$$
$$= \max \{l((k-3)hr,(k-2)hr; n((k-3)hr)) + \max l((k-2)hr, khr; n((k-2)hr))\}$$
$$\leq \max l((k-3)hr,(k-2)hr; n((k-3)hr) + [n((k-2)hr) + a((k-2)hr,(k-1)hr) - (K+1)]^+ + [a((k-1)hr, khr) - r]^+ + [a((k-2)hr,(k-1)hr) - K + r]^+$$

Noting that the first two terms of the equation (B.10) are in the same forms as the equation (B.2), and that the remaining terms of the equation (B.10) are constant terms, it follows that:

$$\max l((k-3)hr, khr; n((k-3)hr)) \quad \text{(B.11)}$$
$$\leq [n((k-3)hr) + a((k-3)hr,(k-2)hr) - (K+1)]^+ + [a((k-2)hr,(k-1)hr) - r]^+ + [a((k-3)hr,(k-2)hr) - K + r]^+ + [a((k-1)hr, khr) - r]^+ + [a((k-2)hr,(k-1)hr) - K + r]^+$$

Thus, $$\max l(0, khr; n(0)) \quad \text{(B.12)}$$
$$\leq [n(0) + a(0,hr) - (K+1)]^+ +$$
$$\sum_{m=1}^{k-1} [a((k-m)hr,(k-m+1)hr) - r]^+ +$$
$$\sum_{m=2}^{k} [a((k-m)hr,(k-m+1)hr) - K + r]^+$$
$$\leq a(0,hr) + \sum_{m=1}^{k-1} [a((k-m)hr,(k-m+1)hr) - r]^+ +$$
$$\sum_{m=2}^{k} [a((k-m)hr,(k-m+1)hr) - K + r]^+$$

Thus, using the above equations and the ergodicity, the true value for the cell loss rate $B_{true} = \lim_{t \to \infty} l(0, khr)/a(0, khr)$ satisfies the following relationship:

$$B_{true} \leq \lim_{k \to \infty} \frac{a(0,hr)}{\sum_{m=1}^{k} a((m-1)hr, mhr)} + \quad \text{(B.13)}$$
$$\frac{\sum_{m=2}^{k} [a((m-1)hr, mhr) - r]^+}{\sum_{m=1}^{k} a((m-1)hr, mhr)} +$$
$$\frac{\sum_{m=1}^{k-1} [a((m-1)hr, mhr) - K + r]^+}{\sum_{m=1}^{k} a((m-1)hr, mhr)}$$
$$= \frac{1}{\text{average number of cells arriving in } hr \text{ sec.}} \sum_{j=0}^{\infty} ([j-r]^+ + [j-K+r]^+)p(j)$$
$$= \sum_{j=0}^{\infty} w(j)p(j)/A$$

This proves that the cell loss rate estimation value obtained by this apparatus of the first embodiment is not small compared with the actual value for the cell loss rate, for a case of using the weight factors (2) with the arbitrary non-negative function d(k) set equal to zero. It is obvious that when $$B_{true} \leq \sum_{j=0}^{\infty} w(j)p(j)/A$$

as demonstrated above, it also follows that $$B_{true} \leq \sum_{j=0}^{\infty} (w(j) + d(k))p(j)/A$$

for any non-negative function d(k), so that the above proof is sufficient for all of the weight factors (2).

A case of using the weight factors (3) can also be proven similarly to the above analysis for the case of using the weight factors (2), so that the detailed description of the proof will be omitted.

Figure 7:
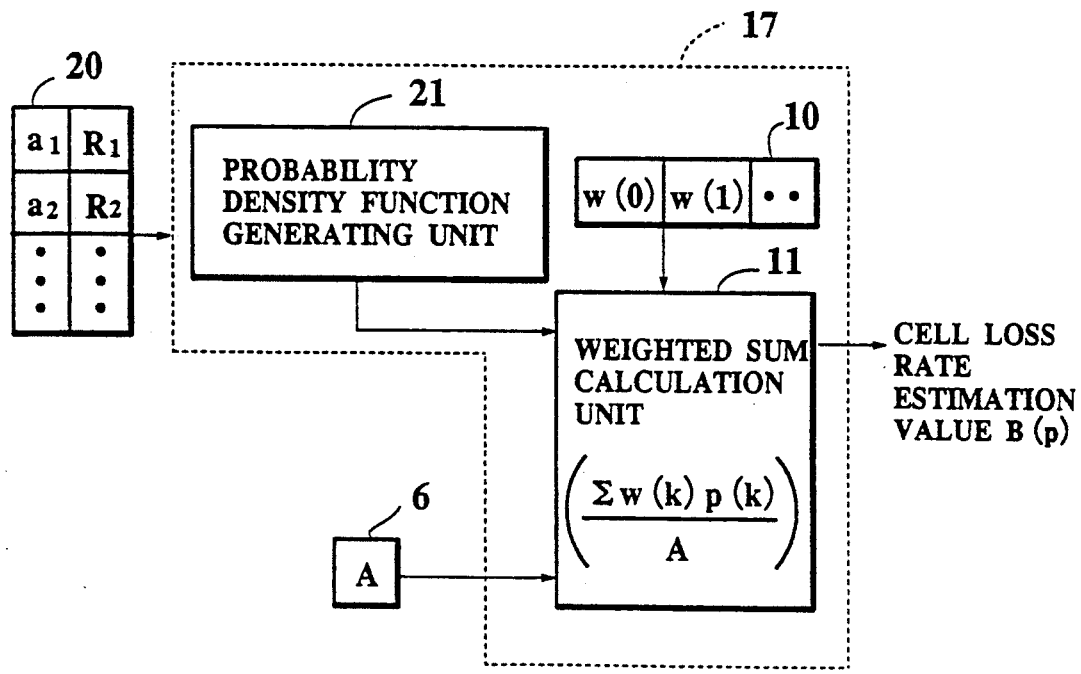
FIG. 7 is a schematic block diagram of another embodiment of an apparatus for cell loss rate estimation according to the present invention.

Referring now to FIG. 7, the second embodiment of an apparatus for cell loss rate estimation according to the present invention will be described.

This embodiment differs from the previous embodiment in that, in this cell loss rate estimation apparatus 17, the probability density functions of number of arriving cells p(k) are obtained from the specified values 20 of an average bit rate $a_i$ and a peak bit rate $R_i$ specified by each call, at a probability density function generating unit 21. The average number A of arriving cells within a period of $T_A$ is still given as the input data from the average number of arriving cells input unit 6, and the other features are substantially equivalent to those of the previous embodiment.

Figure 8:
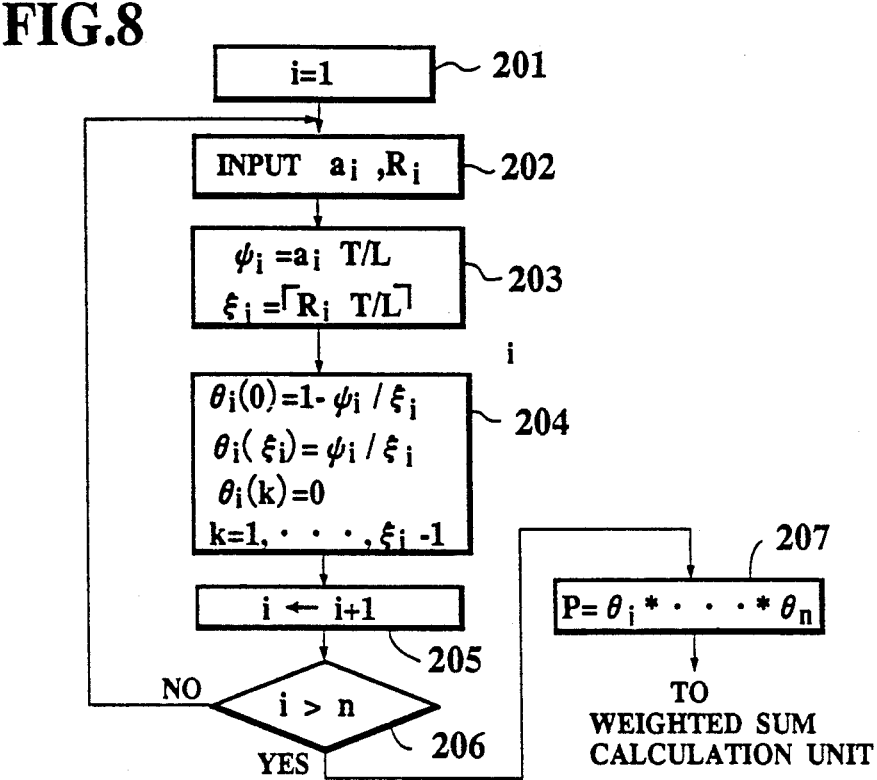
FIG. 8 is a flow chart of the operation of calculating a probability density function for a number of arrived cells in the apparatus of FIG. 7.

The probability density function generating unit 21 operates according to the flow chart of FIG. 8, as follows.

Namely, by a loop formed by the steps 201, 205, and 206, the following steps are performed for each one of n calls.

At the step 202, the specified values of the average bit rate $a_i$ and the peak bit rate $R_i$ are entered.

Next, at the step 203, parameters $\phi_i$ and $\epsilon_i$ are calculated from $a_i$ and $R_i$ according to the following equations:

$$\phi_i = a_i T/L$$

$$\epsilon_i = [R_i T/L]$$

Then, at the step 204, $\theta_i$, the probability distribution of number of cells arriving from each call, is obtained from $\phi_i$ and $\epsilon_i$ according to the following equations:

$$\theta_i(0) = 1 - \phi_i/\epsilon_i$$

$$\theta_i(\epsilon_i) = \phi_i/\epsilon_i$$

$$\theta_i(k) = 0, \ k = 1, \ldots, \epsilon_i - 1$$

When the $\theta_i$ for all n calls are obtained, then at the step 207, the probability density functions of number of arriving cells p(k) are obtained from $\theta_i(k)$ according to the following equation:

$$p(k) = \theta_1 * \ldots * \theta_i * \ldots * \theta_n(k)$$

where * denotes a convolution. Here, the convolution is defined as follows. For two functions $\{p_1(i), i=0, 1, \ldots\}$ and $\{p_2(i), i=0, 1, \ldots\}$, a convolution $\{p_1*p_2(i), i=0, 1, \ldots\}$ is defined as:

$$p_1*p_2(i) = \sum_{k=0}^{i} p_1(k)p_2(i-k)$$

and similarly, for more than two functions $p_1, p_2, \ldots, p_n$, a convolution is defined as:

$$p_1* \ldots *p_n(i) = \sum_{k=0}^{i} (p_1* \ldots *p_{n-1}(k))p_n(i-k)$$

The probability density functions of number of arriving cells p(k) thus obtained are then utilized as the input for the weighted sum calculation unit 11.

Figure 10:
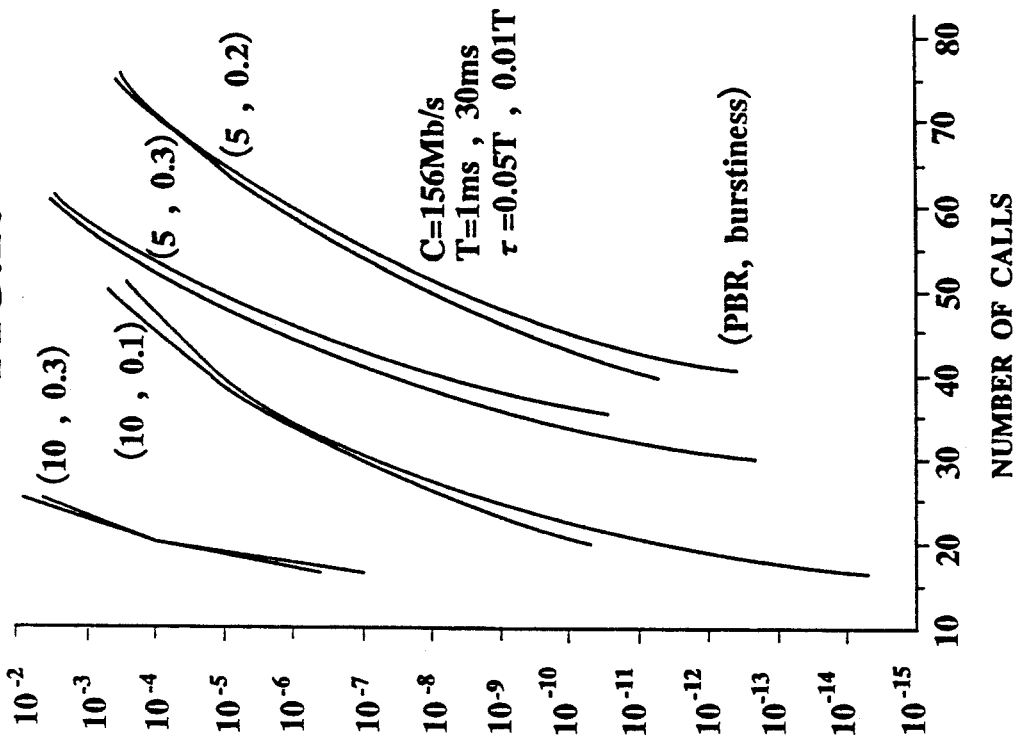
FIG. 10 is a graph of a cell loss rate versus a number of calls obtained by the apparatus of FIG. 7, for a peak bit rate of 5 Mb/s and 10 Mb/s.
Figure 9:
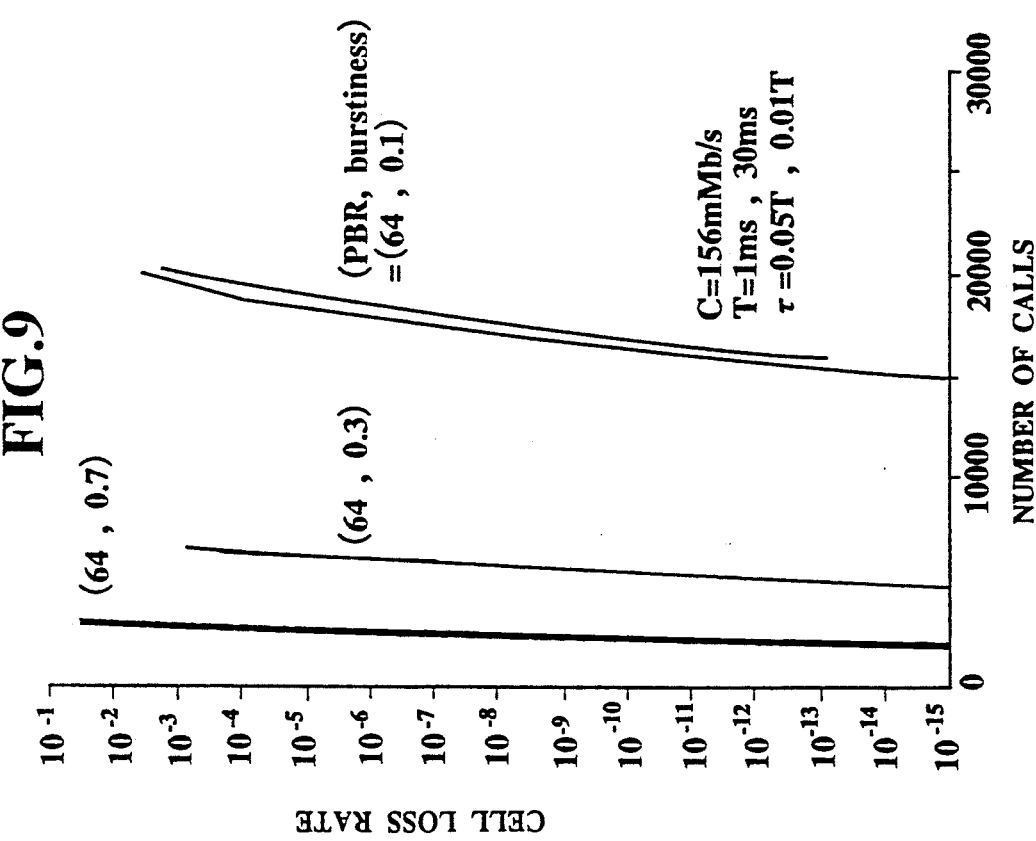
FIG. 9 is a graph of a cell loss rate versus a number of calls obtained by the apparatus of FIG. 7, for a peak bit rate of 64 Kb/s.

Examples of the cell loss rate estimation values B(p) obtained by this apparatus of the second embodiment are shown in FIGS. 9, 10, 11, and 12. For the examples of FIGS. 9 and 10, the following settings are used:

$C = 156$ Mb/s $T = 1$ ms, 30 ms $\tau = 0.05T, 0.01T,$ where $\tau = T_A - T$, $T = KL/C$ and where the weight factors (1) described above are used. Of these, the example of FIG. 9 shows the case of using the peak bit rate (PBR) of 64 Kb/s, while the example of FIG. 10 shows the case of using the peak bit rate of 5 Mb/s and 10 Mb/s. In FIGS. 9 and 10, burstiness=average bit rate/peak bit rate is also indicated by the curves, along with the peak bit rate used.

Figure 12:
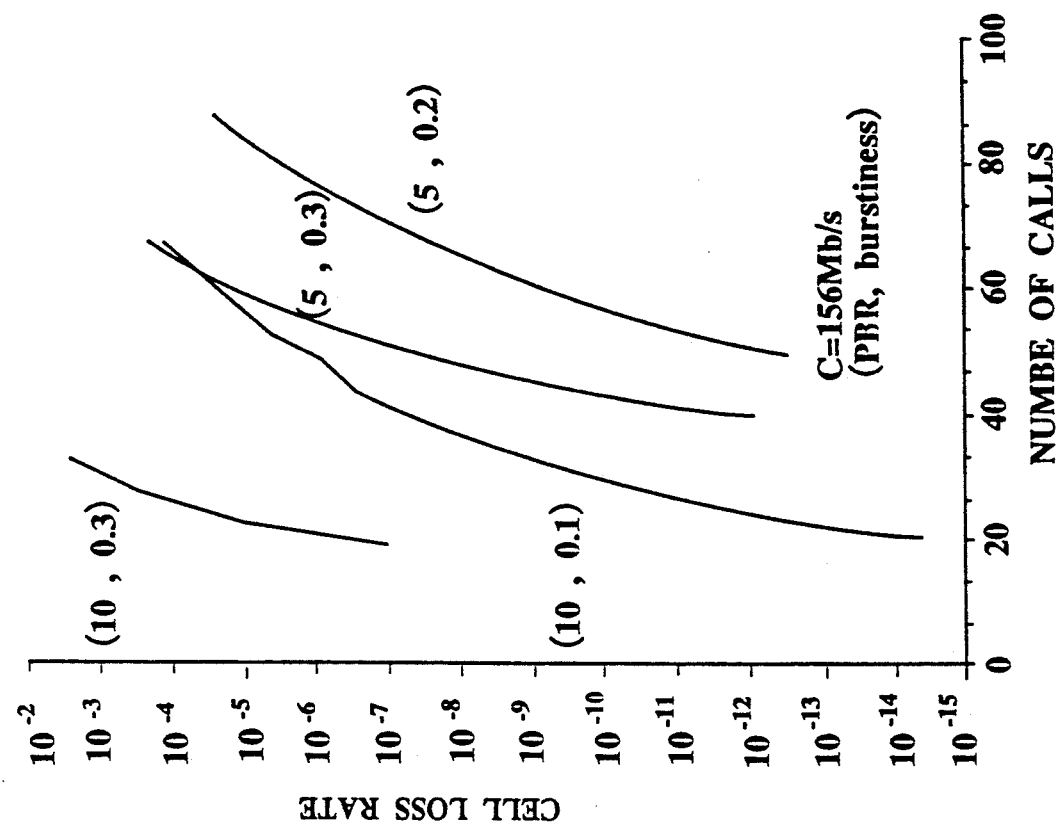
FIG. 12 is a graph of a cell loss rate versus a number of calls obtained by the apparatus of FIG. 7, for a peak bit rate of 5 Mb/s and 10 Mb/s and optimal values of a parameter r.
Figure 11:
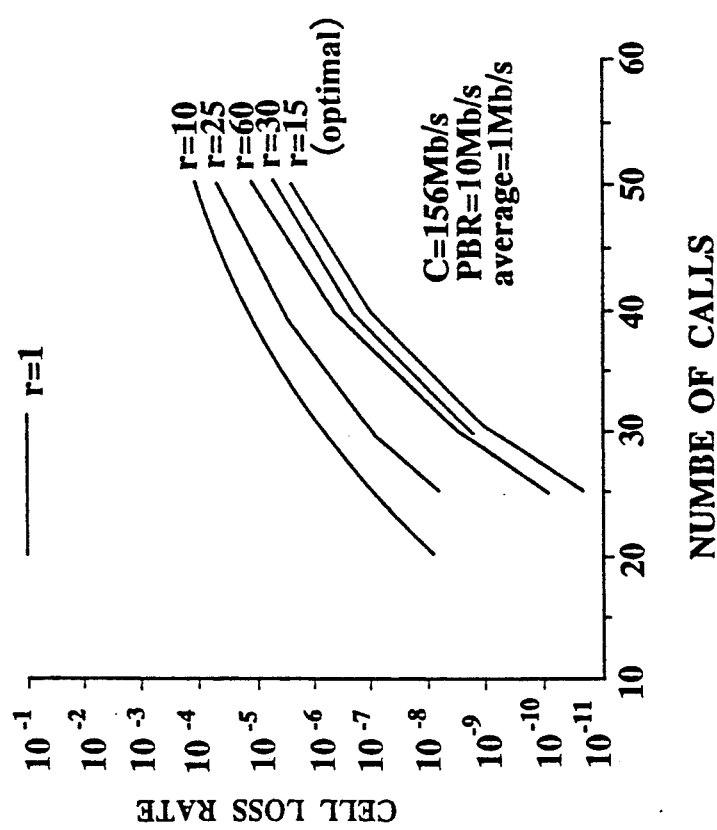
FIG. 11 is a graph of a cell loss rate versus a number of calls obtained by the apparatus of FIG. 7, for a peak bit rate of 10 Mb/s and various values of a parameter r.

For the examples of FIGS. 11 and 12, the weight factors (2) described above are used. In FIG. 11, results for various values of $r = T_A C/L$ are shown under the following settings:

$C = 156$ Mb/s peak bit rate = 10 Mb/s average bit rate = 1 Mb/s (i.e., burstiness = 0.1)

whereas in FIG. 12, results for the optimal value of r are shown for the peak bit rate of 5 Mb/s and 10 Mb/s and various values of burstiness.

The fact that the cell loss rate estimation value obtained by this apparatus of the second embodiment is not small compared with the actual value for the cell loss rate can be verified as follows.

Here, it is assumed that there are n calls, and the probability density functions of number of arriving cells p(k) are defined in terms of the actual probability density functions of number of cells arriving from each call $\{p_i(k)\}$ of the first embodiment as:

$$p(k) = p_1 * \ldots *p_i* \ldots *p_n(k)$$

In the following, first, it will be shown that the following inequality:

$$B(p_1* \ldots *p_i* \ldots *p_n) \leq B(p_1* \ldots *\theta_i* \ldots *p_n)$$

holds for an arbitrary $p_i(k)$. Here, however, $\{p_i(k)\}$ are assumed to be satisfying the given conditions on the average bit rate $a_i$ and the peak bit rate $R_i$.

Now, define a probability density function $p_i^{(l)} = \{p_i^{(l)}(j)\}$, $0 \leq j \leq \epsilon_i$ as follows:

$$p_i^{(l)}(j) = \begin{cases} 0 & \text{for } j = l \\ p_i(j) + (l/\xi_i)P_i(l) & \text{for } j = \xi_i \\ p_i(j) + (1 - (l/\xi_i))p_i(l) & \text{for } j = 0 \\ p_i(j) & \text{otherwise} \end{cases}$$

and let:

$$q = p_1* \ldots *p_{i-1}*p_{i+1}* \ldots *p_n$$

Then, from the following equations (C.1) and (C.2), $$B(p) = B(p_1* \ldots *p_i* \ldots *p_n) \quad \text{(C.1)}$$

$$= \sum_{k=0}^{\infty} w(k)p_1* \ldots *p_i* \ldots *p_n(k)/A$$

$$= \sum_{k=0}^{\infty} w(k)p_i*q(k)/A$$

$$B(p_1* \ldots *p_i^{(l)*} \ldots *p_n) \quad \text{(C.2)}$$

$$= \sum_{k=0}^{\infty} w(k)p_1* \ldots *p_i^{(l)*} \ldots *p_n(k)/A$$

$$= \sum_{k=0}^{\infty} w(k)p_i^{(l)}*q(k)/A$$

it follows that:

$$B(p_1* \ldots *p_i* \ldots *p_n) - B(p_1* \ldots *p_i^{(l)*} \ldots *p_n) \quad \text{(C.3)}$$

$$= \sum_{k=0}^{\infty} \sum_{j=0}^{k} w(k)(p_1(j) - p_i^{(l)}(j))q(k-j)/A$$

$$= \sum_{k=0}^{\infty} \{-w(k)(1 - (l/\xi_i))p_i^{(l)} + w(l+k)p_i(l) -$$

$$w(\xi_i + k)(l/\xi_i)p_i(l)\}q(k)/A$$

Now, for a case of using the weight factors (1), let:

$$f(k) = -[k-K]^+(1-(l/\epsilon_i)) + [l+k-K]^+ - [\epsilon_i + k - K]^+(l/\epsilon_i)$$

then, there are following four cases:

when $k \leq K - \epsilon_i$, \hfill (i)

$f(k) = 0$ when $K - \epsilon_i < k \leq K - l$, \hfill (ii)

$f(k) = -(\epsilon_i + k - K)l/\epsilon_i \leq 0$ when $K - l < k \leq K$ \hfill (iii)

$f(k) = (k-K)(1-(l/\epsilon_i)) \leq 0$ when $K < k$, \hfill (iv)

$f(k) = 0$

Thus, $f(k) \leq 0$ in this case.

Similarly, for a case of using the weight factors (2), let:

$$g(k) = g_1(k) + g_2(k)$$

$$g_1(k) = -[k-r]^+(1-(l/\epsilon_i)) + [l+k-r]^+ - [\epsilon_i+k-r]^+(1-(l/\epsilon_i))$$

$$g_2(k) = -[k-K+r]^+(1-(l/\epsilon_i)) + [l+k-K+r]^+ - [\epsilon_i+k-K+r]^+$$

then, there are following four cases for $g_1$:

when $k \leq r-\epsilon_i$, (i)

$$g_1(k) = 0$$

when $r-\epsilon_i < k \leq r-l$, (ii)

$$g_1(k) = -(\epsilon_i+k-r)l/\epsilon_i < 0$$

when $r-l < k \leq r$ (iii)

$$g_1(k) = (k-r)(1-(l/\epsilon_i)) \leq 0$$

when $r < k$, (iv)

$$g_1(k) = 0$$

and, for $g_2$:

when $k \leq K-r-\epsilon_i$, (i)

$$g_2(k) = 0$$

when $K-r-\epsilon_i < k \leq K-r-l$, (ii)

$$g_2(k) = -(\epsilon_i+k-K+r)l/\epsilon_i < 0$$

when $K-r-l < k \leq K-r$ (iii)

$$g_2(k) = (k-K+r)(1-(l/\epsilon_i)) \leq 0$$

when $r < k$, (iv)

$$g_2(k) = 0$$

Thus, $g(k) \leq 0$ in this case.

Then, it follows that, for either weight factors, $$B(p_1^* \ldots *p_i^* \ldots *p_n) \leq B(p_1^* \ldots *p_i^{(l)*} \ldots *p_n) \quad (C.4)$$

Similarly, $$B(p_1^* \ldots *p_i^{(l)*} \ldots *p_n) \leq B(p_1^* \ldots *p_i^{(l,k)*} \ldots *p_n) \quad (C.5)$$

where $$p_i^{(l,k)}(j) = \begin{cases} 0 & \text{for } j = k \\ p_i^{(l)}(j) + (k/\xi_i)p_i^{(l)}(k) & \text{for } j = \xi_i \\ p_i^{(l)}(j) + (1-(k/\xi_i))p_i^{(l)}(k) & \text{for } j = 0 \\ p_i^{(l)}(j) & \text{otherwise} \end{cases}$$

Therefore, $$B(p_1^* \ldots *p_i^* \ldots *p_n) \leq B(p_1^* \ldots *p_i^{(l)*} \ldots *p_n) \quad (C.6)$$

$$\leq B(p_1^* \ldots *p_i^{(l,k)*} \ldots *P_n)$$

$$\vdots$$

$$\leq B(p_1^* \ldots *\theta_i^* \ldots *p_n)$$

Now, by repeating the above procedure for all $p_i$, it follows that:

$$B(p_1^* \ldots *p_i^* \ldots *p_n) \leq B(\theta_1^* \ldots *\theta_i^* \ldots *\theta_n) \quad (C.7)$$

$$= \sum_{k=0}^{\infty} w(k)\theta_1^* \ldots *\theta_n(k)/A$$

This implies that the cell loss rate estimation by the second embodiment is always larger than that by the first embodiment. Since it has been shown that the cell loss rate estimation value obtained by this apparatus of the first embodiment is not small compared with the actual value for the cell loss rate, it follows that the same is true for the cell loss rate estimation value obtained by the second embodiment as well.

Figure 13:
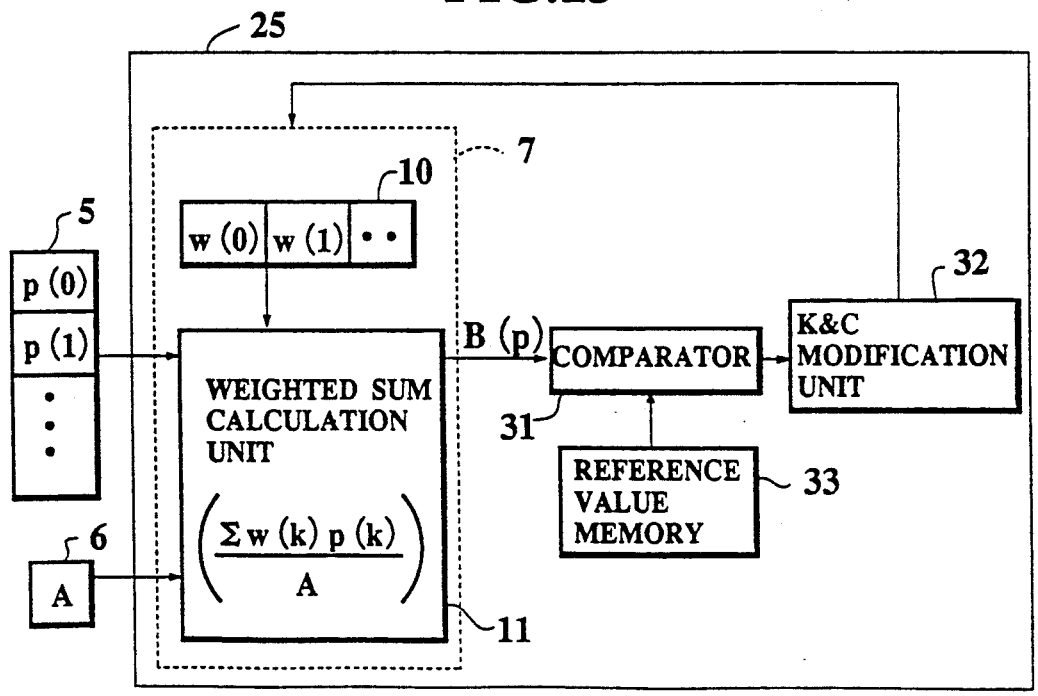
FIG. 13 is a schematic block diagram of one embodiment of an apparatus for buffer link capacity designing according to the present invention.

Referring now to FIG. 13, the first embodiment of an apparatus for buffer/link capacity designing according to the present invention will be described.

This buffer/link capacity designing apparatus 25 includes the cell loss rate estimation apparatus 7 described above, a comparator 31 for comparing the cell loss rate estimation value B(p) obtained by the cell loss rate estimation apparatus 7 with a prescribed cell loss rate reference value $B_A$ stored in a reference value memory 33, and K and C modification unit 32 for changing the buffer capacity K and the link capacity C according to the result of comparison obtained by the comparator 31. Since the weight factors of the cell loss rate estimation apparatus 7 depend on the buffer capacity K and the link capacity C, the new values of the buffer capacity K and the link capacity C are fed back to the cell loss rate estimation apparatus 17 such that the weight factors stored in the memory unit 10 can be updated according to the new values for the buffer capacity K and the link capacity C.

Figure 14:
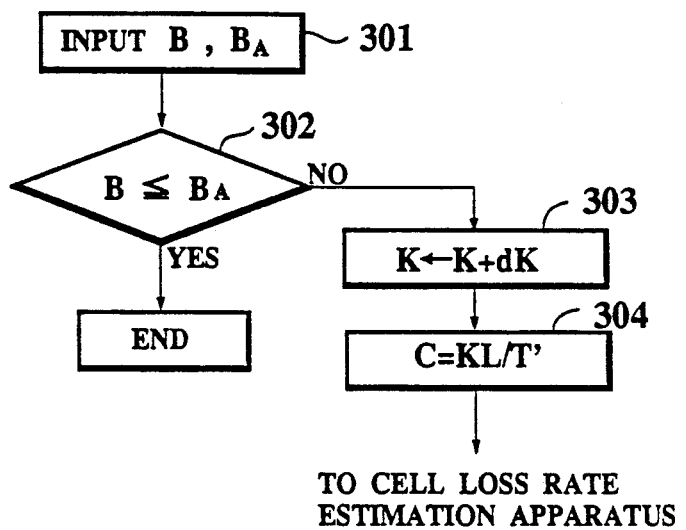
FIG. 14 is a flow chart of the operation of the apparatus of FIG. 13.

This buffer/link capacity designing apparatus 25 operates according to the flow chart of FIG. 14, as follows.

After the cell loss rate estimation value B(p) is obtained by the cell loss rate estimation apparatus 7 as described above, this estimation value B(p) and the cell loss rate reference value $B_A$ are fed to the comparator 31 at the step 301. The comparator 31 then compares these two values at the step 302. If the estimation value B(p) is greater than the reference value $B_A$, then next at the step 303, the buffer capacity K is changed to K+dK, where dK is a predetermined increment, and at the step 304, the link capacity is changed by using the new value of K in a formula C=KL/T', where T' is a predetermined maximum tolerable delay specified by the quality requirement imposed on the buffer. The new values for K and C are then fed to the cell loss rate estimation apparatus 7 in order to update the weight factors stored in the memory unit 10, and the operation is repeated from the beginning using the updated weight factors. When the estimation value B(p) becomes not greater than the reference value $B_A$ at the step 302, then the operation terminates and the values of the buffer capacity K and the link capacity C at that point are taken as the designed values. In the above operation, sufficiently small initial values such as $K=1$ and $C=1$ are used.

Figure 15:
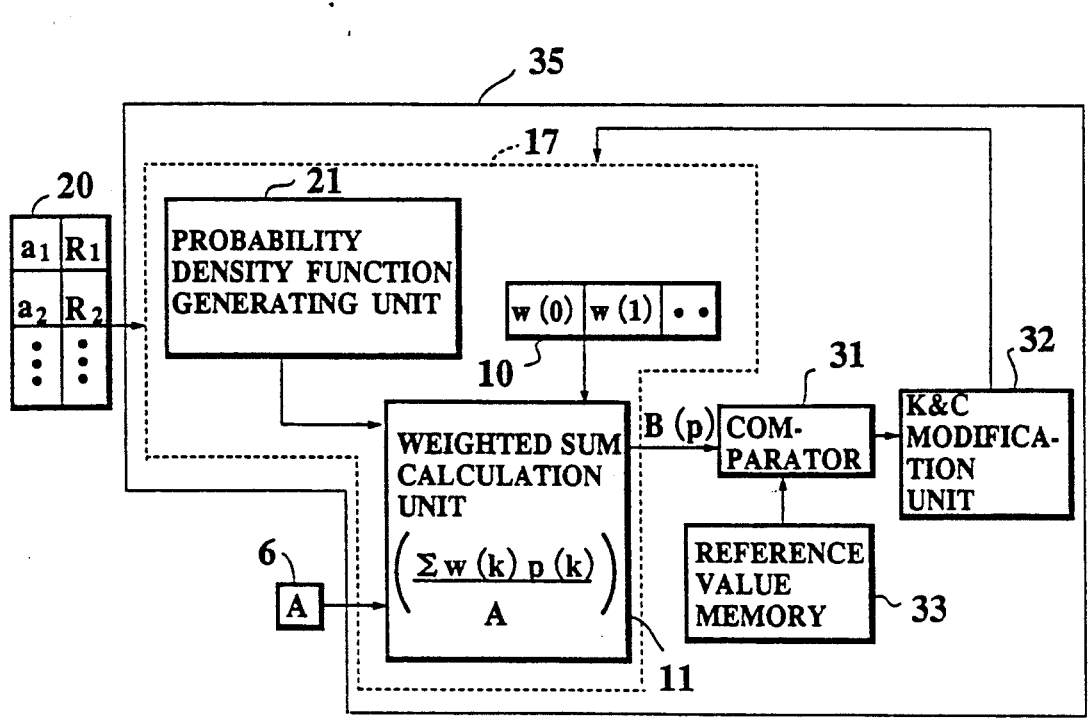
FIG. 15 is a schematic block diagram of another embodiment of an apparatus for buffer link capacity designing according to the present invention.

Referring now to FIG. 15, the second embodiment of an apparatus for buffer/link capacity designing according to the present invention will be described.

This buffer/link capacity designing apparatus 35 differs from the apparatus 25 of the previous embodiment in that it includes the cell loss rate estimation apparatus 17 instead of the cell loss rate estimation apparatus 7. Thus, in this embodiment, the probability density functions of number of arriving cells p(k) obtained from the average bit rate $a_i$ and the peak bit rate $R_i$ at the probability density function generating unit 21 are used in obtaining the cell loss rate estimation value B(p) to be compared with the cell loss rate reference value $B_A$. The remaining features of this apparatus 35 are substantially equivalent to those of the apparatus 25 of the previous embodiment described above.

Figure 16:
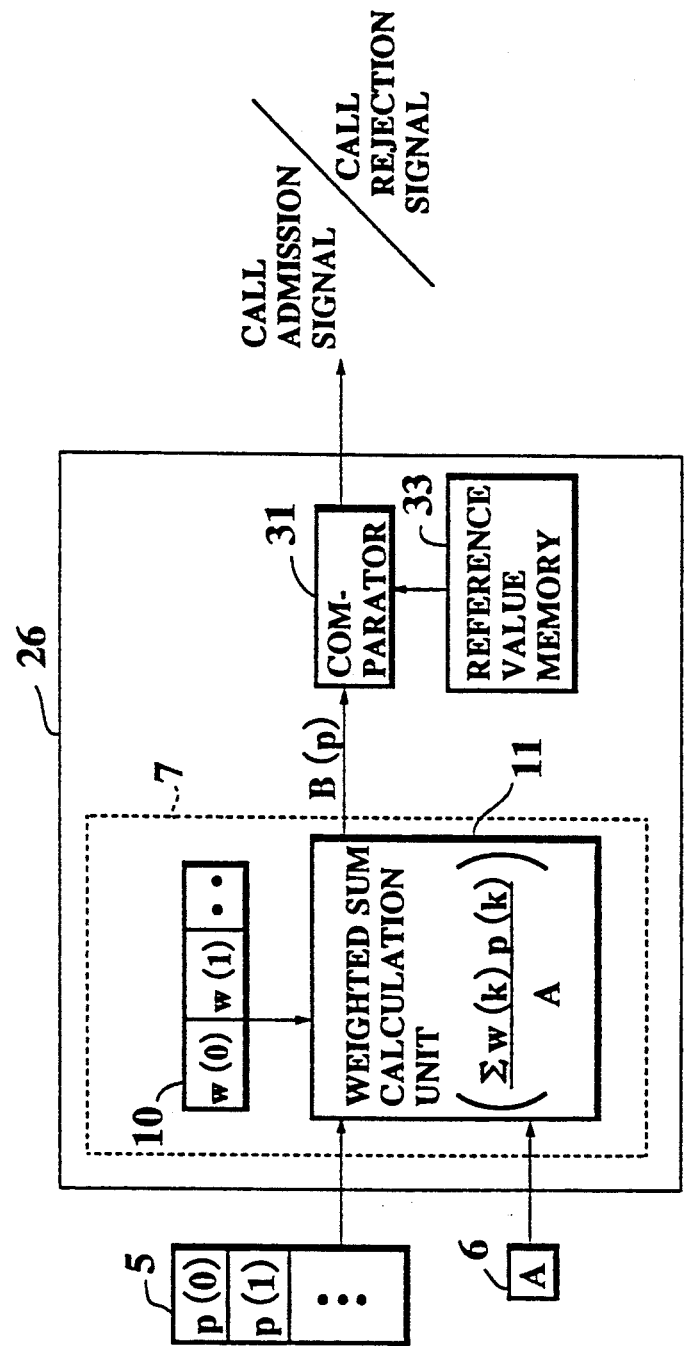
FIG. 16 is a schematic block diagram of one embodiment of an apparatus for call admission control according to the present invention.

Referring now to FIG. 16, the first embodiment of an apparatus for call admission control according to the present invention will be described.

This call admission control apparatus 26 includes the cell loss rate estimation apparatus 7 described above, and a comparator 31 for comparing the cell loss rate estimation value B(p) obtained by the cell loss rate estimation apparatus 7 with a prescribed cell loss rate reference value $B_A$ stored in a reference value memory 33.

When the cell loss rate estimation value B(p) is greater than the cell loss rate reference value $B_A$, the comparator 31 outputs a call rejection signal, whereas otherwise the comparator 31 outputs a call admission signal.

Figure 17:
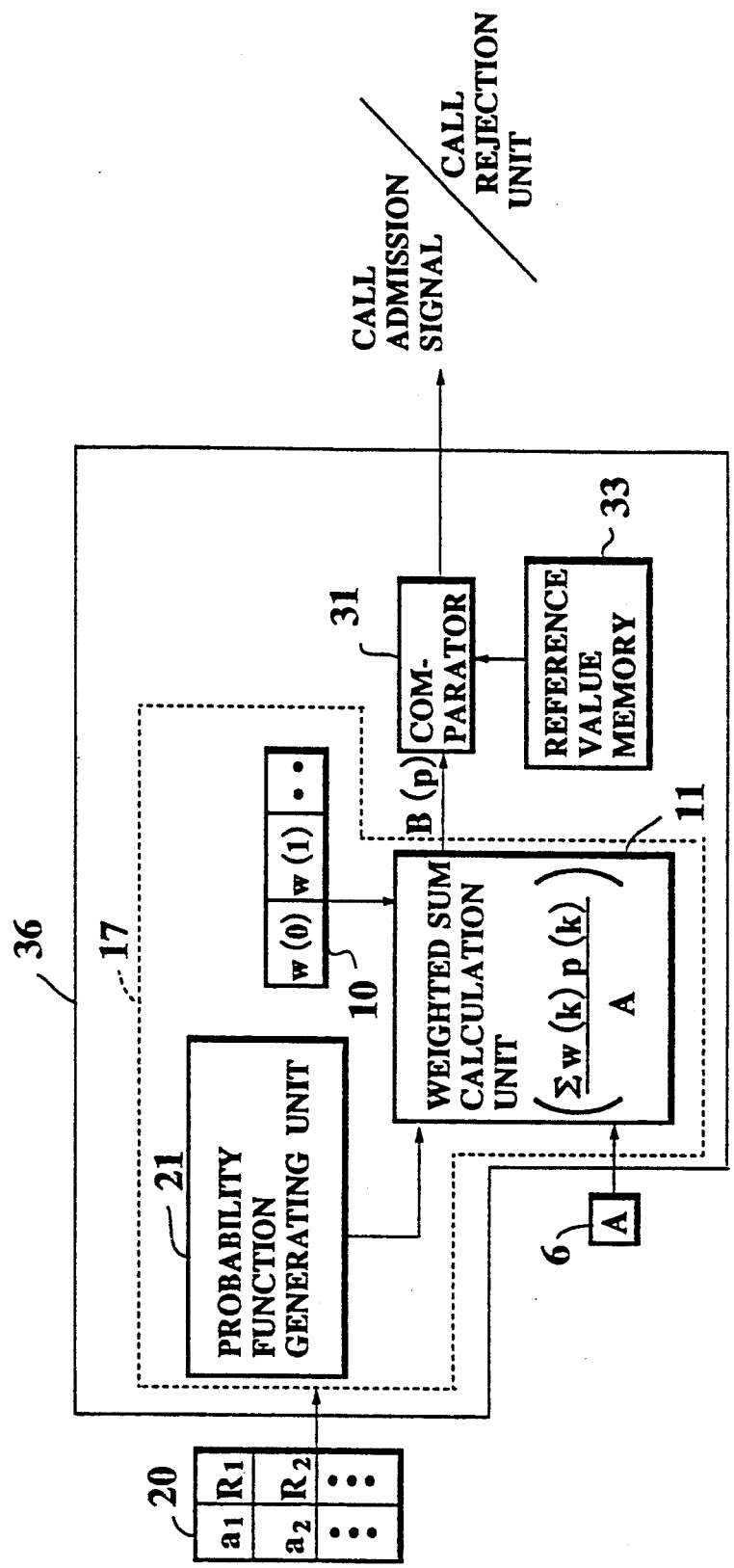
FIG. 17 is a schematic block diagram of another embodiment of an apparatus for call admission control according to the present invention.

Referring now to FIG. 17, the second embodiment of an apparatus for call admission control according to the present invention will be described.

This call admission control apparatus 36 differs from the apparatus 26 of the previous embodiment in that it includes the cell loss rate estimation apparatus 17 instead of the cell loss rate estimation apparatus 7. Thus, in this embodiment, the probability density functions of number of arriving cells p(k) obtained from the average bit rate $a_i$ and the peak bit rate $R_i$ at the probability density function generating unit 21 are used in obtaining the cell loss rate estimation value B(p) to be compared with the cell loss rate reference value $B_A$. The remaining features of this apparatus 36 are substantially equivalent to those of the apparatus 26 of the previous embodiment described above.

It is to be noted that the embodiments described above can also be adapted to the ATM network with an ATM cross connect, in which a physical link capacity is allocated to logical links.

It is also to be noted that the embodiments above can also be adapted to the packet exchanger, although in the packet exchanger, the determination of admission or rejection of a call set up by using the specified parameters is not necessary, unlike the case of the ATM exchanger.

Besides this, many modifications and variations of the above embodiments may be made without departing from the novel and advantageous features of the present invention. Accordingly, all such modifications and variations are intended to be included within the scope of the appended claims.

What is claimed is:

1. A method of call admission control using an estimation of a cell loss rate for a finite capacity output buffer provided at an exchanger in an integrated network, comprising the steps of:

receiving a call containing a number of arriving cells which are arriving at the exchanger from a transmission line of the integrated network;

inputting probability density functions of said number of arriving cells $\{p(k), k=0, 1, \ldots\}$ and an average number of arriving cells A for a prescribed constant period of time $T_A$, where A is a non-negative integer;

calculating a weighted sum $\Sigma\, w(k)p(k)$ of the probability density functions of said number of arriving cells p(k), using weight factors w(k) which depend on a buffer capacity K of the output buffer and a link capacity C of the integrated network, where K and C are non-negative integers;

obtaining an estimation value B(p) for the cell loss rate by dividing the weighted sum $\Sigma\, w(k)p(k)$ by the average number of arriving cells A;

comparing at a comparator the estimation value B(p) obtained by assuming an admission of said call with a prescribed reference value memorized in a reference value memory which is connected to said comparator;

determining a judgement that said call is to be admitted when the estimation value B(p) obtained by assuming an admission of said call becomes not greater than the prescribed reference value, and that said call is to be rejected otherwise according to a result of the comparison obtained by the comparator at the comparing step; and controlling a set up of said call at the exchanger according to the judgement determined at the determining step.

2. The method of claim 1, further comprising the steps of:

inputting specified values of an average bit rate $a_i$ (bit/s) and a peak bit rate $R_i$ (bit/s) from each of n calls arriving at the output buffer, where n is a non-negative integer; and deriving the probability density functions of said number of arriving cells p(k) according to:

$T = KL/C$ $\phi_i = a_i T/L$ $\epsilon_i = \lceil R_i T/L \rceil$ $\theta_i(0) = 1 - \phi_i/\epsilon_i$ $\theta_i(\epsilon) = \phi_i/\epsilon_i$ $\theta_i(k) = 0, \ k = 1, \ldots, \epsilon_i - 1$ $p(k) = \theta_i^* \ldots {}^*\theta_i^* \ldots {}^*\theta_n(k)$ where L (bit) is a cell length, * denotes a convolution, and $\lceil R_i T/L \rceil$ denotes a smallest integer not less than $R_i T/L$.

3. The method of claim 1, wherein the weight factors w(k) are given by:

$$w(k) = \frac{T_A}{T_A - KL/C} <k - K>^+ + d(k),\ k = 0, 1, \ldots$$

where

-continued $$<k - K>^+ = \begin{cases} k - K & \text{if } k - K \geq 0 \\ 0 & \text{if } k - K < 0 \end{cases}$$

and d(k) is an arbitrary non-negative function.

4. The method of claim 1, wherein the weight factors w(k) are given by:

$$w(k) = (<k-r>^+ + <k-K+r>^+) + d(k), k = 0, 1, \ldots$$

where $r = T_A/h$, r is an integer, h (sec) = L/C is a cell transfer time, $$<k - r>^+ = \begin{cases} k - r & \text{if } k - r \geq 0 \\ 0 & \text{if } k - r < 0 \end{cases}$$

$$<k - K + r>^+ = \begin{cases} k - K + r & \text{if } k - K + r \geq 0 \\ 0 & \text{if } k - K + r < 0 \end{cases}$$

and d(k) is an arbitrary non-negative function.

5. The method of claim 1, wherein the weight factors w(k) are given by:

$$w(k) = <k - (CT_a/L)>^+ + d(k), k = 0, 1, \ldots$$

where $CT_a/L \leq (K+1)$, $$<k - (CT_A/L)>^+ = \begin{cases} k - (CT_A/L) & \text{if } k - (CT_A/L) \geq 0 \\ 0 & \text{if } k - (CT_A/L) < 0 \end{cases}$$

and d(k) is an arbitrary non-negative function.

6. An apparatus for call admission control using an estimation of a cell loss rate for a finite capacity output buffer provided at an exchanger in an integrated network, comprising:
    means for receiving a call containing a number of arriving cells which are arriving at the exchanger from a transmission line of the integrated network;
    means for inputting probability density functions of said number of arriving cells {p(k), k=0, 1, ... } and an average number of arriving cells A for a prescribed constant period of time $T_A$, where A is a non-negative integer;
    means for calculating a weighted sum $\Sigma$ w(k)p(k) of the probability density functions of said number of arriving cells p(k), using weight factors w(k) which depend on a buffer capacity K of the output buffer and a link capacity C of the integrated network, where K and C are non-negative integers;
    means for obtaining an estimation value B(p) for the cell loss rate by dividing the weighted sum $\Sigma$ w(k)p(k) by the average number of arriving cells A;
    a reference value memory for memorizing a prescribed reference value;
    a comparator connected to said memory for comparing the estimation value B(p) obtained by assuming an admission of said call with the prescribed reference value;
    means for determining a judgement that said call is to be admitted when the estimation value B(p) obtained by assuming an admission of said call becomes not greater than the prescribed reference value, and that said call is to be rejected otherwise according to a result of the comparison obtained by the comparator; and
    means for controlling a set up of said call at the exchanger according to the judgement determined at the determining means.

7. The apparatus of claim 6, further comprising:
    means for inputting specified values of an average bit rate $a_i$(bit/s) and a peak bit rate $R_i$(bit/s) from each of n calls arriving at the output buffer, where n is a non-integer; and
    means for deriving the probability density functions of said number of arriving cells p(k) according to:

$$T = KL/C$$

$$\phi_i = a_i T/L$$

$$\epsilon_i = [R_i T/L]$$

$$\theta_i(0) = 1 - \phi_i/\epsilon_i$$

$$\theta_i(\epsilon) = \phi_i/\epsilon_i$$

$$\theta_i(k) = 0, k = 1, \ldots, \epsilon_i - 1$$

$$p(k) = \theta_i^* \ldots {}^*\theta_i^* \ldots {}^*\theta_n(k)$$

where L (bit) is a cell length, * denotes a convolution, and $[R_i T/L]$ denotes a smallest integer not less than $R_i T/L$.

8. The apparatus of claim 6, wherein the weight factors w(k) are given by:

$$w(k) = \frac{T_A}{T_A - KL/C} <k - K>^+ + d(k), k = 0, 1, \ldots$$

where $$<k - K>^+ = \begin{cases} k - K & \text{if } k - K \geq 0 \\ 0 & \text{if } k - K < 0 \end{cases}$$

and d(k) is an arbitrary non-negative function.

9. The apparatus of claim 6, wherein the weight factors w(k) are given by:

$$w(k) = (<k-r>^+ + <k-K+r>^+) + d(k), k = 0, 1, \ldots$$

where $r = T_A/h$, r is an integer, h (sec) = L/C is a cell transfer time, $$<k - r>^+ = \begin{cases} k - r & \text{if } k - r \geq 0 \\ 0 & \text{if } k - r < 0 \end{cases}$$

$$<k - K + r>^+ = \begin{cases} k - K + r & \text{if } k - K + r \geq 0 \\ 0 & \text{if } k - K + r < 0 \end{cases}$$

and d(k) is an arbitrary non-negative function.

10. The apparatus of claim 6, wherein the weight factors w(k) are given by:

$$w(k) = <k - (CT_A/L)>^+ + d(k), k = 0, 1, \ldots$$

where $CT_A/L \leq (K+1)$, $$<k - (CT_A/L)>^+ = \begin{cases} k - (CT_A/L) & \text{if } k - (CT_A/L) \geq 0 \\ 0 & \text{if } k - (CT_A/L) < 0 \end{cases}$$

and d(k) is an arbitrary non-negative function.

11. A method of buffer/link capacity controlling for a finite capacity output buffer provided at an exchanger in an integrated network, comprising the steps of:
  receiving a call containing a number of arriving cells which are arriving at the exchanger from a transmission line of the integrated network;
  inputting probability density functions of said number of arriving cells $\{p(k), k=0, 1, \ldots\}$ and an average number of arriving cells A for a prescribed constant period of time $T_A$, where A is a non-negative integer;
  calculating a weighted sum $\Sigma w(k)p(k)$ of the probability density functions of said number of arriving cells p(k), using weight factors w(k) which depend on a buffer capacity K of the output buffer and a link capacity C of the integrated network, where K and C are non-negative integers;
  obtaining an estimation value B(p) for the cell loss rate by dividing the weighted sum $\Sigma w(k)p(k)$ by the average number of arriving cells A;
  comparing at a comparator the estimation value B(p) with a prescribed reference value memorized in a reference value memory which is connected to said comparator;
  determining appropriate values of the buffer capacity K and the link capacity C such that the estimation value B(p) becomes not greater than the prescribed reference value according to a result of the comparison obtained by the comparator at the comparing step; and
  controlling the buffer capacity K and the link capacity C according to the appropriate values determined at the determining step.

12. The method of claim 11, further comprising the steps of:
  inputting specified values of an average bit rate $a_i$ (bit/s) and a peak bit rate $R_i$ (bit/s) from each of n calls arriving at the output buffer, where n is a non-integer; and
  deriving the probability density functions of said number of arriving cells p(k) according to:

$$T = KL/C$$

$$\phi_i = a_i T/L$$

$$\epsilon_i = [R_i T/L]$$

$$\theta_i(0) = 1 - \phi_i/\epsilon_i$$

$$\theta_i(\epsilon) = \phi_i/\epsilon_i$$

$$\theta_i(k) = 0, k = 1, \ldots, \epsilon_i - 1$$

$$p(k) = \theta_1 * \ldots * \theta_i * \ldots * \theta_n(k)$$

where L (bit) is a cell length, * denotes a convolution, and $[R_iT/L]$ denotes a smallest integer not less than $R_iT/L$.

13. The method of claim 11, wherein the weight factors w(k) are given by:

$$w(k) = \frac{T_A}{T_A - KL/C} <k - K>^+ + d(k), k = 0, 1, \ldots$$

where $$<k - K>^+ = \begin{cases} k - K & \text{if } k - K \geq 0 \\ 0 & \text{if } k - K < 0 \end{cases}$$

and d(k) is an arbitrary non-negative function.

14. The method of claim 11, wherein the weight factors w(k) are given by:

$$w(k) = (<k-r>^+ + <k-K+r>^+) + d(k), k = 0, 1, \ldots$$

where $r = T_A/h$, r is an integer, h (sec) = L/C is a cell transfer time, $$<k - r>^+ = \begin{cases} k - r & \text{if } k - r \geq 0 \\ 0 & \text{if } k - r < 0 \end{cases}$$

$$<k - K + r>^+ = \begin{cases} k - K + r & \text{if } k - K + r \geq 0 \\ 0 & \text{if } k - K + r < 0 \end{cases}$$

and d(k) is an arbitrary non-negative function.

15. The method of claim 11, wherein the weight factors w(k) are given by:

$$w(k) = <k - (CT_A/L)>^+ d(k), k = 0, 1, \ldots$$

where $CT_A/L \leq (K+1)$, $$<k - (CT_A/L)>^+ = \begin{cases} k - (CT_A/L) & \text{if } k - (CT_A/L) \geq 0 \\ 0 & \text{if } k - (CT_A/L) < 0 \end{cases}$$

and d(k) is an arbitrary non-negative function.

16. An apparatus for buffer/link capacity controlling for a finite capacity output buffer provided at an exchanger in an integrated network, comprising:
  means for receiving a call containing a number of arriving cells which are arriving at the exchanger from a transmission line of the integrated network;
  means for inputting probability density functions of said number of arriving cells $\{p(k), k=0, 1, \ldots\}$ and an average number of arriving cells A for a prescribed constant period of time $T_A$, where A is a non-negative integer;
  means for calculating a weighted sum $\Sigma w(k)p(k)$ of the probability density functions of said number of arriving cells p(k), using weight factors w(k) which depend on a buffer capacity K of the output buffer and a link capacity C of the integrated network, where K and C are non-negative integers;
  means for obtaining an estimation value B(p) for the cell loss rate by dividing the weighted sum $\Sigma$ w(k)p(k) by the average number of arriving cells A;

a reference value memory for memorizing a prescribed reference value;

a comparator connected to said memory for comparing the estimation value B(p) with the prescribed reference value;

means for determining appropriate values of the buffer capacity K and the link capacity C such that the estimation value B(p) becomes not greater than the prescribed reference value according to a result of the comparison obtained by the comparator; and means for controlling a buffer capacity K and the link capacity C according to the appropriate values determined by the determining means.

17. The apparatus of claim 16, further comprising:

means for inputting specified values of an average bit rate $a_i$(bit/s) and a peak bit rate $R_i$(bit/s) from each of n calls arriving at the output buffer, where n is a non-negative integer; and means for deriving the probability density functions of said number of arriving cells p(k) according to:

$$T = KL/C$$

$$\phi_i = a_i T/L$$

$$\epsilon_i = [R_i T/L]$$

$$\theta_i(0) = 1 - \phi_i/\epsilon_i$$

$$\theta_i(\epsilon) = \phi_i/\epsilon_i$$

$$\theta_i(k) = 0, \ k = 1, \ldots, \epsilon - 1$$

$$p(k) = \theta_i^* \ldots {}^*\theta_i^* \ldots {}^*\theta_n(k)$$

where L (bit) is a cell length, * denotes a convolution, and $[R_i T/L]$ denotes a smallest integer not less than $R_i T/L$.

18. The apparatus of claim 16, wherein the weight factors w(k) are given by:

$$w(k) = \frac{T_A}{T_A - KL/C} <k - K>^+ + d(k), \ k = 0, 1, \ldots$$

where $$<k - K>^+ = \begin{cases} k - K & \text{if } k - K \geq 0 \\ 0 & \text{if } k - K < 0 \end{cases}$$

and d(k) is an arbitrary non-negative function.

19. The apparatus of claim 16, wherein the weight factors w(k) are given by:

$$w(k) = (<k-r>^+ + <k-K+r>^+) + d(k), \ k = 0, 1, \ldots$$

where $r = T_A/h$, r is an integer, h (sec) = L/C is a cell transfer time, $$<k - r>^+ = \begin{cases} k - r & \text{if } k - r \geq 0 \\ 0 & \text{if } k - r < 0 \end{cases}$$

$$<k - K + r>^+ = \begin{cases} k - K + r & \text{if } k - K + r \geq 0 \\ 0 & \text{if } k - K + r < 0 \end{cases}$$

and d(k) is an arbitrary non-negative function.

20. The apparatus of claim 16, wherein the weight factors w(k) are given by:

$$w(k) = <k - (CT_A/L)>^+ + d(k), \ k = 0, 1, \ldots$$

where $CT_A/L \leq (K+1)$, $$<k - (CT_A/L)>^+ = \begin{cases} k - (CT_A/L) & \text{if } k - (CT_A/L) \geq 0 \\ 0 & \text{if } k - (CT_A/L) < 0 \end{cases}$$

and d(k) is an arbitrary non-negative function.

* * * * *

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

At column 1, line 9, "so called" should be --so-called--;

column 1, line 12, "network," should be --networks,--;

column 1, line 14, "designing" should be --design--;

column 1, line 17, "attentions" should be --attention--;

column 1, line 18, "network." should be --networks.--;

column 1, line 25, "have" should be --has--;

column 1, line 52, "receiving" should be --receiving a--; and

Column 1, line 60, "the" (2nd occurrence) should be --a--.

At column 2, line 2, "have to" should be --must--;

column 2, line 4, "and" should be --also--;

column 2, line 13, "on a" should be --on the--;

column 2, line 15, "a" should be --the--;

column 2, line 17, delete "a";

UNITED STATES PATENT AND TRADEMARK OFFICE
CERTIFICATE OF CORRECTION

PATENT NO. : 5,166,894

DATED : November 24, 1992

INVENTOR(S) : HIROSHI SAITO

It is certified that error appears in the above-identified patent and that said Letters Patent is hereby corrected as shown below:

column 2, line 18, "a" should be --the--;

column 2, line 23, "a case the requesting call is" should be --case the requesting call--;

column 2, line 31 "by a" should be --by the--;

column 2, line 37, "in a case" should be --in case--;

column 2, line 38, "high-speed" should be --high speed--;

column 2, line 42, "designing" should be --design--;

column 2, line 62, "designing" should be --design--;

column 2, line 67, "these" should be --this--; and column 2, line 68, "designing" should be --design--.

At column 3, lines 15-16, "design-ing" should be --design--;

column 3, line 18, "designing" should be --design--;

column 3, line 40, the symbol "$\alpha$" used in the formula should be the symbol --$\infty$--;

column 3, line 44, "so called" should be --so-called--;

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

column 3, line 48, "method," should be --methods,--;

column 3, line 51, "designing" should be --design--;

column 3, line 52, "designing" should be --design--; and column 3, line 65, "high-speed" should be --high speed--.

At column 4, line 1, "being requiring a so called" should be --requiring a so-called--; and column 4, line 20, "designing" should be --design--.

At column 6, line 28, "designing" should be --design--;

column 6, line 34, "designing" should be --design--;

column 6, line 55, "$\sum_{k=0}^{\alpha}$" should be --$\sum_{j=0}^{\infty}$--; and column 6, line 61, "for arriving" should be --of arriving--.

At column 7, line 49, "designing" should be --design--;

column 7, line 58, "of" should be --of time--; and column 7, line 63, "of" should be --of time--.

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

At column 8, line 3, "period of" should be --period of time--;

column 8, line 32, t, 1(s,t) should be --t, $l(s,t)$--;

column 8, line 38, formula A.1 should be:

-- 
$$n(t) \leq [n(t-T)-K]^+ + a(t-T,t)$$
$$\leq a(t-T,t)+1$$
--;

column 8, lines 40-41, formula A.2 should be:

--
$$l(i\tau,(i+1)\tau \leq [n(i\tau)+a(i\tau,(i+1)\tau)-K-1]^+$$
$$\leq [a(i\tau-T,(i+1)\tau)-K]^+$$
--;

column 8, line 44, "a" should be --the--;

column 8, line 49, "are" should be --are the--; and column 8, line 68 should be:

--$\lim_{t \to \infty} l(0,t)/\tilde{a}(0,t)$ satisfies the following relationship:--.

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

At column 9, line 3, in the first line of formula A.6,

"$\sum_{j=0}^{\alpha}$" should be --$\sum_{j=0}^{\infty}$--;

column 9, line 6, in the second line of formula A.6,

"$\sum_{j=0}^{\alpha}$" should be --$\sum_{j=0}^{\infty}$--;

column 9, line 9, in the third line of formula A.6,

"$\sum_{j=0}^{\alpha}$" should be --$\sum_{j=0}^{\infty}$--;

column 9, line 31, "a" (two occurrences) should be --the--;

column 9, line 33, "t,1(s,t) be a" should be --t,1(s,t) be the--;

column 9, line 34, "be a" should be --be the--;

Column 9, line 36, "1(s,t; n(s))" should be --1(s,t; n(s))--;

column 9, line 38, "1(0, khr; n(0))," should be

--1(0, khr; n(0)),--; and

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

column 9, line 45, "is a" should be --is the--.

At column 10, line 21, "is a" should be --is the--;

column 10, line 24, "n(t) = [W(t)/L] = [W(t)/(hC)]" should be

--$n(t) = \lceil W(t)/L \rceil = \lceil W(t)/(hC) \rceil$--;

column 10, line 26, "[X]" should be --$\lceil X \rceil$--;

column 10, lines 32-34, formula B.5 should be:

-- $i_2 = i((k-2)hr, (k-1)hr)/h$
$+ \{\lceil W((k-1)hr)/(Ch) \rceil - W((k-1)hr)/(Ch)\}$
$- \{\lceil W((k-2)hr)/(Ch) \rceil - W((k-2)hr)/(Ch)\}$ --;

column 10, line 43, "a larger one of" should be

--the larger of--;

column 10, line 46, formula B.7 should be:

-- $l_2(n_2) \leq [n_2 + a(2) - (K+1)]^+$ --;

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

column 10, line 56-58, formula B.8 should be:

$$i_2 \leq [r-W((k-2)hr)/(Ch) + \{\lceil W((k-1)hr)/(Ch)\rceil - W((k-1)hr)/(Ch)\}$$

-- ; and $$- \{\lceil W((k-2)hr)/(Ch)\rceil - W((k-2)hr)/(Ch)\}]^+$$

$$\leq [r+1-n_2]^+$$

columns 9-10 (bottom of page), line 3 of formula B.9 should be:

$$-- \max\{[n_2+a(2)-(K+1)]^+, [n_2+a(2)-(K+1)+a(1)-r]^+\} \quad \text{if } r+1 \leq n_2 \quad --.$$

At column 11, line 12, "forms" should be --form--;

column 11, line 39, "$\lim_{t\to\omega} l(0,$" should be --$\lim_{t\to\infty} l(0,$--;

column 11, line 43-44, the first line of formula B.13 should be:

$$-- B_{true} \leq \lim_{k\to\infty} \frac{a(0,hr)}{\sum_{m-1}^{k} a((m-1)hr,mhr)} \quad --;$$

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

column 11, line 56-58, the fourth line of formula B.13 should be:

$$-- = \frac{1}{\text{average number of cell arriving in hr sec}} \sum_{j=0}^{\infty} ([j-r]^+ + [j-K+r]^+) p(j) \text{ --; and}$$

column 11, line 60-62, the fifth line of formula B.13 should be:

$$-- = \sum_{j=0}^{\infty} w(j) p(j) / A \text{ --.}$$

At column 12, lines 10-11, " $\sum_{j=0}^{\alpha}$ " should be $-- \sum_{j=0}^{\infty} --;$ column 12, line 15-16, " $\sum_{j=0}^{\alpha}$ " should be $-- \sum_{j=0}^{\infty} --;$ column 12, line 34, "of" should be: --of time--;

column 12, line 52, "$\in_i = [R_i T/L]$" should be $--\xi_i = \lceil R_i T/L \rceil --.$ column 12, line 57, "$e_i(0) = 1 - \varnothing_i/\in_i$" should be
    $-- e_i(0) = 1 - \varnothing_i/\xi_i --;$ Page 8 of 29

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO It is certified that error appears in the above-identified patent and that said Letters Patent is hereby corrected as shown below:

column 12, line 59, "$e_i(\epsilon_i) = \emptyset_i/\epsilon_i$" should be

-- $e_i(\xi_i) = \emptyset_i/\xi_i$ --; and column 12, line 61, "$e_i(k = 0, k = 1, \ldots, \epsilon_i - 1$" should be -- $e_i(k) = 0, k = 1, \ldots, \xi_i - 1$ --.

At column 13, line 14 should read:

-- $p_1 * \cdots * p_n(i) = \sum_{k=0}^{i} (p_1 * \cdots * p_{n-1}(k)) p_n(i-k)$ --; and column 13, line 66 should be:

-- $B(p_1 * \cdots * p_i * \cdots * p_n) \leq B(p_1 * \cdots * e_i * \cdots * p_n)$ --.

At column 14, lines 4-5 should be:

--Now, define a probability density function $p_i^{(1)} = \{p_i^{(1)}(j)\}$, $0 \leq j \leq \xi_i$ as follows:--;

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

column 14, the second line of formula C.1 should be:

$$-- = \sum_{k=0}^{\infty} w(k) p_1 * \cdots * p_i * \cdots * p_n(k)/A --;$$

column 14, the third line of formula C.1 should be:

$$-- = \sum_{k=0}^{\infty} w(k) p_i * q(k)/A --;$$

column 14, the second line of formula C.2 should be:

$$-- = \sum_{k=0}^{\infty} w(k) p_1 * \cdots * p_i^{(1)} * \cdots * p_n(k)/A --;$$

column 14, the third line of formula C.2 should be:

$$-- = \sum_{k=0}^{\infty} w(k) p_i^{(1)} * q(k)/A --;$$

column 14, the second line of formula C.3 should be:

$$-- = \sum_{k=0}^{\infty} \sum_{j=0}^{k} w(k)(p_1(j) - p_i^{(1)}(j)) q(k-j)/A --;$$

column 14, the third line of formula C.3 should be:

$$-- = \sum_{k=0}^{\infty} \{-w(k)(1-(1/\xi_i)) p_i^{(1)} + w(1+k) p_i^{(1)} --;$$

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

column 14, the fourth line of formula C.3 should be:

-- $-w(\xi_i+k)(1/\xi_i)p_i(1)\}q(k)/A$ --;

column 14, line 48-49 should be:

-- $f(k)=-[k-K]^+(1-(1/\xi_i))+[1+k-K]^+-[\xi_i+k-K]^+(1/\xi_i)$ --; and column 14, lines 53-66 should be:

(i) when $k \leq_i K-\xi$ , $f(k) = 0$ (ii) when $K-\xi < k \leq K - 1$,

-- $f(k) = -(\xi_i +k-K)1/\xi \leq_i 0$ --.

(iii) when $K-1 < k \leq K$, $f(k) = (k-K)(1-(1/\xi_i)) \leq 0$ (iv) when $K < k$, $f(k) = 0$

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

At column 15, lines 6-10 should be:

$$g_1(k) = -[k-r]^+(1-1/\xi_i)) + [1+k-r]^+ - [\xi_i+k-r]^+(1-(1/\xi_i))$$

$$g_2(k) = -[k-K+r]^+(1-(1/\xi_i)) + [1+k-K+r]^+ - [\xi_i+k-K+r]^+$$

--;

column 15, lines 14-49 should be

-- (i) when $k \leq r-\xi_i$, $$g_1(k) = 0$$

(ii) when $r-\xi_i < k \leq r-1$, $$g_1(k) = -(\xi_i+k-r)1/\xi_i < 0$$

(iii) when $r-1 < k \leq r$, $$g_1(k) = (k-r)(1-(1/\xi_i)) \leq 0$$

(iv) when $r < k$, $$g_1(k) = 0$$

and, for $g_2$:

(i) when $k \leq K - r - \xi_i$, $$g_2(k) = 0$$

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

(ii) when $K-r-\xi_i < k \leq K-r-1$, $$g_2(k) = -(\xi_i+k-K+r)1/\xi_i < 0$$

(iii) when $K-r-1 < k \leq K-r$, $$g_2(k) = (k-K+r)(1-(1/\xi_i)) \leq 0$$

(iv) when $r < k$, $$g_2(k) = 0 \quad --; \text{ and}$$

column 15, line 49, "factors" should be -- factor--.

At column 16, the second line of formula C.7 should be:

$$-- \sum_{k=0}^{\infty} w(k)\theta_i^* \cdots * \theta_n(k)/A$$

column 16, line 29, "designing" should be --design--;

column 16, line 31, "designing" should be --design--; and column 16, line 48, "designing" should be --design--.

At column 17, line 4, "designed" should be --design--.

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

Column 18, lines 37-61, should read as follows:

2. The method of claim 1, further comprising the steps of:

inputting specified values of an average bit rate $a_i$ (bit/s) and a peak bit rate $R_i$ (bit/s) from each of n calls arriving at the output buffer, where n is a non-negative integer; and deriving the probability density functions of said number of arriving cells p(k) according to:

$T = KL/C$ $\varnothing_i = a_i T/L$ $\xi_i = \lceil R_i T/L \rceil$ $\theta_i(0) = 1 - \varnothing_i/\xi_i$ $\theta_i(\xi) = \varnothing_i/\xi_i$ $\theta_i(k) = 0, \quad k = 1, \ldots, \xi_i - 1$

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

$$p(k) = \Theta_i * \ldots * \Theta_i * \ldots * \Theta_n(k)$$

where L (bit) is a cell length, * denotes a convolution, and $\lceil R_i T/L \rceil$ denotes a smallest integer not less than $R_i T/L$.

Cols. 18-19, lines 62-68 and lines 1-7, should read as follows:
3. The method of claim 1, wherein the weight factors w(k) are given by:

$$w(k) = \frac{T_A}{T_A - KL/C} [k - K]^+ + d(k), \quad k = 0, 1, \ldots$$

where $$[k-K]^+ = \begin{cases} k-K & \text{if } k-K \geq 0 \\ 0 & \text{if } k-K < 0 \end{cases}$$

and d(k) is an arbitrary non-negative function.

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

Column 19, lines 9-27

4. The method of claim 1, wherein the weight factors w(k) are given by:

$$w(k) = ([k - r]^+ + [k - K + r]^+) + d(k), \quad k = 0, 1, \ldots$$

where $r = T_A/h$, r is an integer, h (sec) = L/C is a cell transfer time, $$[k-r]^+ = \begin{cases} k-r & \text{if } k-r \geq 0 \\ 0 & \text{if } k-r < 0 \end{cases}$$

$$[k-K+r]^+ = \begin{cases} k-K+r & \text{if } k-K+r \geq 0 \\ 0 & \text{if } k-K+r < 0 \end{cases}$$

and d(k) is an arbitrary non-negative function.

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

Col. 19, lines 28-39

5. The method of claim 1, wherein the weight factors w(k) are given by:

$$w(k) = [k - (CT_A/L)]^+ + d(k), \quad k = 0, 1, \ldots$$

where $CT_A/L \leq (K + 1)$, $$[k-(CT_A/L)]^+ = \begin{cases} k-(CT_A/L) & \text{if } k-(CT_A/L) \geq 0 \\ 0 & \text{if } k-(CT_A/L) < 0 \end{cases}$$

and d(k) is an arbitrary non-negative function.

Col. 20, lines 11-33

7. The apparatus of claim 6, further comprising:

means for inputting specified values of an average bit rate $a_i$ (bit/s) and a peak bit rate $R_i$ (bit/s) from each of n calls arriving at the output buffer, where n is a non-integer; and means for deriving the probability density functions of said number of arriving cells p(k) according to:

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

$$T = KL/C$$

$$\varnothing_i = a_i T/L$$

$$\xi_i = \lceil R_i T/L \rceil$$

$$e_i(0) = 1 - \varnothing_i/\xi_i$$

$$e_i(\xi) = \varnothing_i/\xi_i$$

$$e_i(k) = 0, \quad k = 1, \ldots, \xi_i - 1$$

$$p(k) = e_i * \ldots * e_i * \ldots * e_n(k)$$

where L (bit) is a cell length, * denotes a convolution, and $\lceil R_i T/L \rceil$ denotes a smallest integer not less than $R_i T/L$.

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

8. The apparatus of claim 6, wherein the weight factors w(k) are given by:

$$w(k) = \frac{T_A}{T_A - KL/C} [k - K]^+ + d(k), \quad k = 0, 1, \ldots$$

where $$[k-K]^+ = \begin{cases} k-K & \text{if } k-K \geq 0 \\ 0 & \text{if } k-K < 0 \end{cases}$$

and d(k) is an arbitrary non-negative function.

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

9. The apparatus of claim 6, wherein the weight factors $w(k)$ are given by:

$$w(k) = ([k - r]^+ + [k - K + r]^+) + d(k), \quad k = 0, 1, \ldots$$

where $r = T_A/h$, $r$ is an integer, $h$ (sec) $= L/C$ is a cell transfer time, $$[k-r]^+ = \begin{cases} k-r & \text{if } k-r \geq 0 \\ 0 & \text{if } k-r < 0 \end{cases}$$

$$[k-K+r]^+ = \begin{cases} k-K+r & \text{if } k-K+r \geq 0 \\ 0 & \text{if } k-K+r < 0 \end{cases}$$

and $d(k)$ is an arbitrary non-negative function.

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO It is certified that error appears in the above-identified patent and that said Letters Patent is hereby corrected as shown below:

10. The apparatus of claim 6, wherein the weight factors $w(k)$ are given by:

$$w(k) = [k - (CT_A/L)]^+ + d(k), \quad k = 0, 1, \ldots$$

where $CT_A/L \leq (K + 1)$, $$[k-(CT_A/L)]^+ = \begin{cases} k-(CT_A/L) & \text{if } k-(CT_A/L) \geq 0 \\ 0 & \text{if } k-(CT_A/L) < 0 \end{cases}$$

and $d(k)$ is an arbitrary non-negative function.

12. The method of claim 11, further comprising the steps of:
   inputting specified values of an average bit rate $a_i$ (bit/s) and a peak bit rate $R_i$ (bit/s) from each of n calls arriving at the output buffer, where n is a non-integer; and
   deriving the probability density functions of said number of arriving cells $p(k)$ according to:

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

$$T = KL/C$$

$$\varnothing_i = a_i T/L$$

$$\xi_i = \lceil R_i T/L \rceil$$

$$\theta_i(0) = 1 - \varnothing_i/\xi_i$$

$$\theta_i(\xi) = \varnothing_i/\xi_i$$

$$\theta_i(k) = 0, \quad k = 1, \ldots, \xi_i - 1$$

$$p(k) = \theta_i * \ldots * \theta_i * \ldots * \theta_n(k)$$

where L (bit) is a cell length, * denotes a convolution, and $\lceil R_i T/L \rceil$ denotes a smallest integer not less than $R_i T/L$.

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

13. The method of claim 11, wherein the weight factors w(k) are given by:

$$w(k) = \frac{T_A}{T_A - KL/C} [k - K]^+ + d(k), \quad k = 0, 1, \ldots$$

where $$[k-K]^+ = \begin{cases} k-K & \text{if } k-K \geq 0 \\ 0 & \text{if } k-K < 0 \end{cases}$$

and d(k) is an arbitrary non-negative function.

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO It is certified that error appears in the above-identified patent and that said Letters Patent is hereby corrected as shown below:

14. The method of claim 11, wherein the weight factors w(k) are given by:

$$w(k) = ([k - r]^+ + [k - K + r]^+) + d(k), \quad k = 0, 1, \ldots$$

where $r = T_A/h$, r is an integer, h (sec) = L/C is a cell transfer time, $$[k-r]^+ = \begin{cases} k-r & \text{if } k-r \geq 0 \\ 0 & \text{if } k-r < 0 \end{cases}$$

$$[k-K+r]^+ = \begin{cases} k-K+r & \text{if } k-K+r \geq 0 \\ 0 & \text{if } k-K+r < 0 \end{cases}$$

and d(k) is an arbitrary non-negative function.

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

15. The method of claim 11, wherein the weight factors w(k) are given by:

$$w(k) = [k - (CT_A/L)]^+ + d(k), \quad k = 0, 1, \ldots$$

where $CT_A/L \leq (K + 1)$, $$[k-(CT_A/L)]^+ = \begin{cases} k-(CT_A/L) & \text{if } k-(CT_A/L) \geq 0 \\ 0 & \text{if } k-(CT_A/L) < 0 \end{cases}$$

and d(k) is an arbitrary non-negative function.

17. The apparatus of claim 16, further comprising:
   means for inputting specified values of an average bit rate $a_i$ (bit/s) and a peak bit rate $R_i$ (bit/s) from each of n calls arriving at the output buffer, where n is a non-negative integer; and
   means for deriving the probability density functions of said number of arriving cells p(k) according to:

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

$$T = KL/C$$

$$\varnothing_i = a_i T/L$$

$$\xi_i = \lceil R_i T/L \rceil$$

$$\Theta_i(0) = 1 - \varnothing_i/\xi_i$$

$$\Theta_i(\xi) = \varnothing_i/\xi_i$$

$$\Theta_i(k) = 0, \quad k = 1, \ldots, \xi_i - 1$$

$$p(k) = \Theta_i * \ldots * \Theta_i * \ldots * \Theta_n(k)$$

where L (bit) is a cell length, * denotes a convolution, and $\lceil R_i T/L \rceil$ denotes a smallest integer not less than $R_i T/L$.

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

18. The apparatus of claim 16, wherein the weight factors w(k) are given by:

$$w(k) = \frac{T_A}{T_A - KL/C} [k - K]^+ + d(k), \quad k = 0, 1, \ldots$$

where $$[k-K]^+ = \begin{cases} k-K & \text{if } k-K \geq 0 \\ 0 & \text{if } k-K < 0 \end{cases}$$

and d(k) is an arbitrary non-negative function.

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO It is certified that error appears in the above-identified patent and that said Letters Patent is hereby corrected as shown below:

19. The apparatus of claim 16, wherein the weight factors $w(k)$ are given by:

$$w(k) = ([k - r]^+ + [k - K + r]^+) + d(k), \quad k = 0, 1, \ldots$$

where $r = T_A/h$, $r$ is an integer, $h$ (sec) $= L/C$ is a cell transfer time, $$[k-r]^+ = \begin{cases} k-r & \text{if } k-r \geq 0 \\ 0 & \text{if } k-r < 0 \end{cases}$$

$$[k-K+r]^+ = \begin{cases} k-K+r & \text{if } k-K+r \geq 0 \\ 0 & \text{if } k-K+r < 0 \end{cases}$$

and $d(k)$ is an arbitrary non-negative function.

UNITED STATES PATENT AND TRADEMARK OFFICE
CERTIFICATE OF CORRECTION

PATENT NO. : 5,166,894
DATED : November 24, 1992
INVENTOR(S) : HIROSHI SAITO

It is certified that error appears in the above-identified patent and that said Letters Patent is hereby corrected as shown below:

20. The apparatus of claim 16, wherein the weight factors $w(k)$ are given by:

$$w(k) = [k - (CT_A/L)]^+ + d(k), \quad k = 0, 1, \ldots$$

where $CT_A/L \leq (K + 1)$, $$[k-(CT_A/L)]^+ = \begin{cases} k-(CT_A/L) & \text{if } k-(CT_A/L) \geq 0 \\ 0 & \text{if } k-(CT_A/L) < 0 \end{cases}$$

and $d(k)$ is an arbitrary non-negative function.

Signed and Sealed this

Eighth Day of November, 1994

Attest:

BRUCE LEHMAN

*Attesting Officer*     *Commissioner of Patents and Trademarks*